US012587895B2

(12) United States Patent (10) Patent No.: US 12,587,895 B2
Pateromichelakis et al. (45) Date of Patent: Mar. 24, 2026

(54) MANAGING THE QOS OF AN END-TO-END APPLICATION SESSION

(71) Applicant: Lenovo (Singapore) Pte. Ltd., New Tech Park (SG)

(72) Inventors: Emmanouil Pateromichelakis, Viersen (DE); Apostolis Salkintzis, Athens (GR); Dimitrios Karampatsis, Ruislip (GB)

(73) Assignee: Lenovo (Singapore) Pte. Ltd., Singapore (SG)

( * ) Notice: Subject to any disclaimer, the term of this patent is extended or adjusted under 35 U.S.C. 154(b) by 324 days.

(21) Appl. No.: 18/023,655

(22) PCT Filed: Aug. 26, 2020

(86) PCT No.: PCT/EP2020/073815
§ 371 (c)(1),
(2) Date: Feb. 27, 2023

(87) PCT Pub. No.: WO2022/042830
PCT Pub. Date: Mar. 3, 2022

(65) Prior Publication Data
US 2023/0284078 A1 Sep. 7, 2023

(51) Int. Cl.
*H04W 28/02* (2009.01)
*H04W 28/24* (2009.01)

(52) U.S. Cl.
CPC ....... *H04W 28/0268* (2013.01); *H04W 28/24* (2013.01)

(58) Field of Classification Search
CPC ............. H04W 28/0268; H04W 28/24; H04W 56/0015; H04W 76/20; H04W 28/0215;
(Continued)

(56) References Cited

U.S. PATENT DOCUMENTS

| | | | |
|---|---|---|---|
| 11,102,122 B2 | 8/2021 | Seed et al. | |
| 2019/0212724 A1* | 7/2019 | Phuyal | ................. H04W 76/32 |

(Continued)

FOREIGN PATENT DOCUMENTS

| | | |
|---|---|---|
| CN | 1351790 A | 5/2002 |
| CN | 108353262 A | 7/2018 |

(Continued)

OTHER PUBLICATIONS

InterDigital, "Clarification of the definition of a UAS", 3GPP TSG-SA1 Meeting #90, S1-202058 (Year: 2020).*

(Continued)

*Primary Examiner* — Ayaz R Sheikh
*Assistant Examiner* — Mang Boi Thawng
(74) *Attorney, Agent, or Firm* — Kunzler Needham & Hilton

(57) ABSTRACT

Apparatuses, methods, and systems are disclosed for end-to-end QoS fulfillment. One apparatus includes an application interface that receives a request to manage the QoS of an end-to-end application session. Here, the end-to-end application session comprises a first session of a first UE connected to a first network and a second session of a second UE connected to a second network. The processor configures a first QoS parameter for the first session of the first UE and a second QoS parameter for the second session of the second UE and receives a trigger event related to the QoS change of the second QoS parameter. The processor determines a third QoS parameter for the first session of the first UE based on the QoS change of the second QoS parameter and communicates the third QoS parameter to the first network.

20 Claims, 12 Drawing Sheets

(58) Field of Classification Search
 CPC .............. H04W 28/0226; H04W 84/06; H04B
 7/18504; B64U 2101/00
 See application file for complete search history.

(56) References Cited

U.S. PATENT DOCUMENTS

| | | | | |
|---|---|---|---|---|
| 2020/0178052 A1* | 6/2020 | Pattan | ................... | H04W 80/12 |
| 2021/0329460 A1* | 10/2021 | Liao | ...................... | H04W 12/37 |
| 2022/0086741 A1* | 3/2022 | Liao | ......................... | G08G 5/26 |
| 2022/0277657 A1* | 9/2022 | Xiang | ...................... | G08G 5/22 |
| 2022/0377545 A1* | 11/2022 | Wang | ............... | H04W 12/0471 |
| 2023/0156554 A1* | 5/2023 | Ferdi | ......................... | G08G 5/53 |
| | | | | 370/331 |
| 2023/0239724 A1* | 7/2023 | Pateromichelakis | . | H04W 24/02 |
| | | | | 370/230 |
| 2025/0220539 A1* | 7/2025 | Ferdi | ......................... | G08G 5/21 |

FOREIGN PATENT DOCUMENTS

| | | | | | | |
|---|---|---|---|---|---|---|
| CN | 110809295 A | 2/2020 | | | | |
| EP | 1703668 A1 | 9/2006 | | | | |
| JP | 2021536714 A | 12/2021 | | | | |
| WO | 2017024100 A1 | 2/2017 | | | | |
| WO | 2019158218 A1 | 8/2019 | | | | |
| WO | WO-2019158219 A1 * | 8/2019 | | ......... | H04L 47/2433 | |

OTHER PUBLICATIONS

InterDigital, "Connectivity setup for C2 communication and association between UAV and UAV-C", SA WG2 Meeting #138, S2-200xxxx (Year: 2020).*

PCT/EP2020/073815, "Notification of the International Search Report and the Written Opinion of the International Searching Authority, or the Declaration", International Searching Authority, May 11, 2021, pp. 1-13.

Huawei et al., "PDU Sessions and QoS flows", 3GPP TSG-SA WG2 Meeting #140E e-meeting S2-2005664, Aug. 19-Sep. 1, 2020, pp. 1-4.

Motorola Mobility et al., "Proposal of Key Issue on assisting C2 mode switching", 3GPP TSG-SA WG6 Meeting #38-e S6-201090, Jul. 20-31, 2020, pp. 1-3.

3GPP, "3rd Generation Partnership Project; Technical Specification Group Services and System Aspects; Enhancement for Unmanned Aerial Vehicles; Stage 1 (Release 17)", 3GPP TR 22.829 V17.1.0, Sep. 2019, pp. 1-47.

3GPP, "3rd Generation Partnership Project; Technical Specification Group Radio Access Network; NR; Multiplexing and channel coding (Release 16)", 3GPP TS 38.212 V16.2.0, Jun. 2020, pp. 1-151.

3GPP, "3rd Generation Partnership Project; Technical Specification Group Radio Access Network; NR; Physical layer procedures for data (Release 16)", 3GPP TS 38.214 V16.2.0, Jun. 2020, pp. 1-163.

3GPP, "3rd Generation Partnership Project; Technical Specification Group Radio Access Network; NR; User Equipment (UE) procedures in Idle mode and RRC Inactive state (Release 16)", 3GPP TS 38.304 V16.1.0, Jul. 2020, pp. 1-39.

3GPP, "3rd Generation Partnership Project; Technical Specification Group Radio Access Network; NR; Radio Resource Control (RRC) protocol specification (Release 16)", 3GPP TS 38.331 V16.1.0, Jul. 2020, pp. 1-906.

* cited by examiner

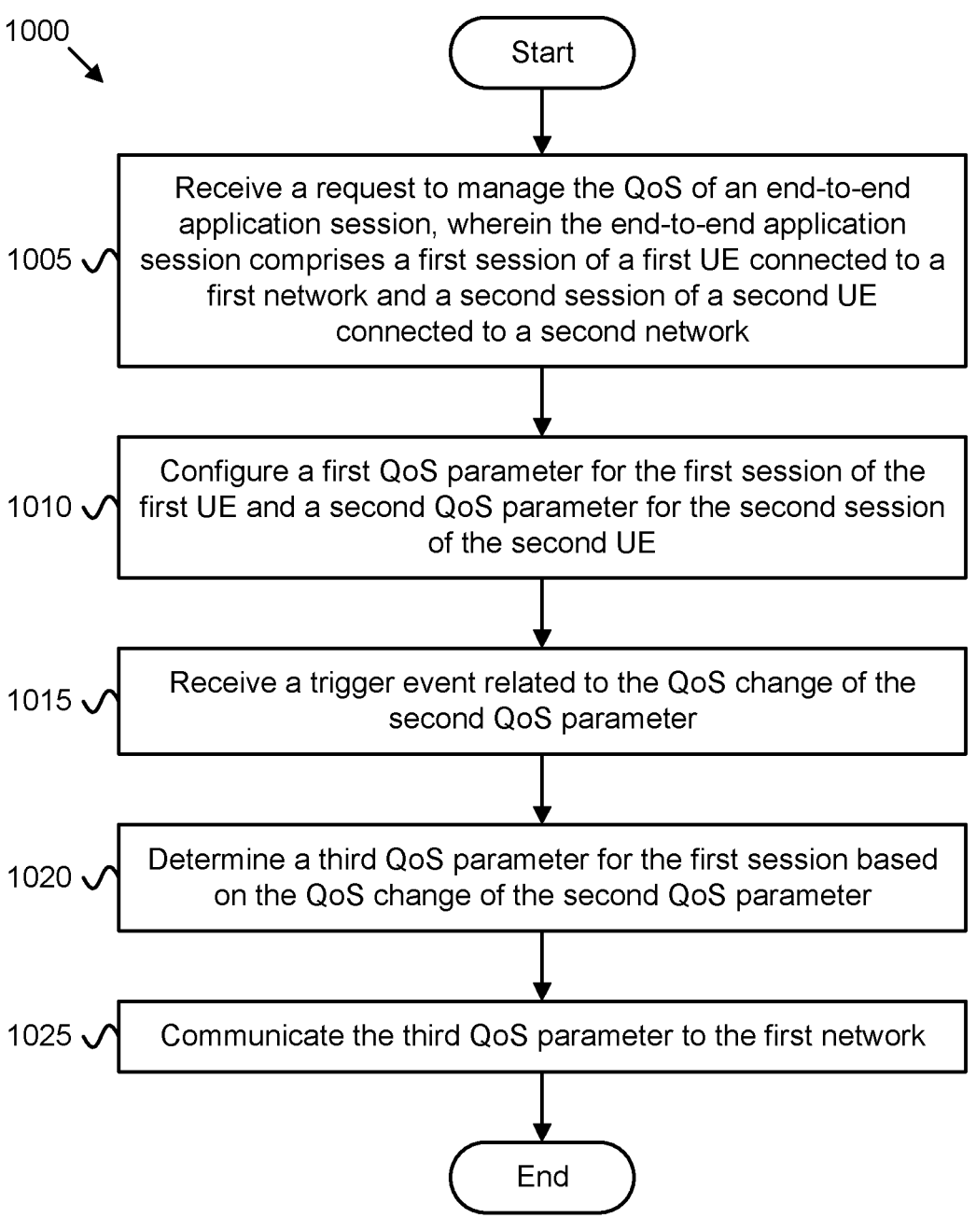

1000

Start

1005 — Receive a request to manage the QoS of an end-to-end application session, wherein the end-to-end application session comprises a first session of a first UE connected to a first network and a second session of a second UE connected to a second network 1010 — Configure a first QoS parameter for the first session of the first UE and a second QoS parameter for the second session of the second UE 1015 — Receive a trigger event related to the QoS change of the second QoS parameter 1020 — Determine a third QoS parameter for the first session based on the QoS change of the second QoS parameter 1025 — Communicate the third QoS parameter to the first network

End

FIG. 10

MANAGING THE QOS OF AN END-TO-END APPLICATION SESSION

FIELD

The subject matter disclosed herein relates generally to wireless communications and more particularly relates to end-to-end QoS fulfillment.

BACKGROUND

The following abbreviations are herewith defined, at least some of which are referred to within the following description: Third Generation Partnership Project ("3GPP"), Fifth Generation Core Network ("5CG"), Fifth Generation System ("5GS"), Fifth Generation QoS Identifiers ("5QI"), Authentication, Authorization and Accounting ("AAA"), Advanced Intersection Collision Warning ("AICW"), Access and Mobility Management Function ("AMF"), Positive-Acknowledgment ("ACK"), Application Programming Interface ("API"), Access Stratum ("AS"), Base Station ("BS"), Category of Requirements ("CoR"), Command-and-Control ("C2"), Control Element ("CE"), Cooperating merging ("CM"), Cooperative Overtaking ("CO"), Cooperating Transition of Control ("CToC"), Cooperative Lane Change ("CLC"), Collective Perception ("CP"), Collective Perception Message ("CPM"), Core Network ("CN"), Connected and Autonomous Vehicle ("CAV"), Decentralized Environmental Notification Message ("DENM"), Downlink ("DL"), Discontinuous Transmission ("DTX"), Evolved Node-B ("eNB"), Evolved Packet Core ("EPC"), Evolved Packet System ("EPS"), Evolved UMTS Terrestrial Radio Access ("E-UTRA"), Evolved UMTS Terrestrial Radio Access Network ("E-UTRAN"), European Telecommunications Standards Institute ("ETSI"), General Packet Radio Service ("GPRS"), Generic Public Service Identifier ("GPSI"), Global System for Mobile Communications ("GSM"), Hybrid Automatic Repeat Request ("HARQ"), Home Subscriber Server ("HSS"), Information Element ("IE"), Internet-of-Things ("IoT"), International Mobile Equipment Identity ("IMEI"), Intelligent Transportation System ("ITS"), ITS Station ("ITS-S"), Infrastructure to Vehicle Information Message ("IVIM"), Key Performance Indicator ("KPI"), Level of Automation ("LoA"), Long Term Evolution ("LTE"), Mobility Management ("MM"), Mobility Management Entity ("MME"), Map (topology) Extended Message ("MAPEM"), Maneuver Control ("MC"), Maneuver Control Message ("MCM"), Negative-Acknowledgment ("NACK") or ("NAK"), New Generation (5G) Node-B ("gNB"), New Generation Radio Access Network ("NG-RAN", a RAN used for 5GS networks), New Radio ("NR", a 5G radio access technology; also referred to as "5G NR"), Non-Access Stratum ("NAS"), Network Slice Selection Assistance Information ("NSSAI"), Overtaking Vehicle Warning ("OVW"), Packet Data Unit ("PDU", used in connection with 'PDU Session'), PC5 5QI ("PQI"), Permanent Equipment Identifier ("PEI"), Platoon Control ("PC"), Platoon Control Message ("PCM"), Proximity Service ("ProSe"), Public Land Mobile Network ("PLMN"), Quality of Service/Experience ("QoS"), Radio Access Network ("RAN"), Receive ("RX"), Road Side Unit ("RSU"), Service Enabler Architecture Layer ("SEAL"), Session Management ("SM"), Session Management Function ("SMF"), Service Provider ("SP"), Single Network Slice Selection Assistance Information ("S-NSSAI"), Signal Phase And Timing Extended Message ("SPATEM"), Signal Request Extended Message ("SREM"), Signal request Status Extended Message ("SSEM"), Target Driving Area Reservation ("TDAR"), Transport Block ("TB"), Transmit ("TX"), Vehicle-to-Everything ("V2X"), Vehicle-to-Infrastructure ("V2I"), Vehicle-to-Vehicle ("V2V"), Vehicle-to-Relay ("V2R"), V2X Application Enabler ("VAE"), Vulnerable Road User Protection ("VRUP"), Unified Data Management ("UDM"), Unmanned Aerial System ("UAS"), UAS Application Enabler ("UAE", i.e., having a UAE server and at least one UAE client), UAS Service Suppliers ("USS"), UAS Traffic Manager ("UTM"), Unmanned Aerial Vehicle ("UAV"), UAV Controller ("UAV-C"), User Data Repository ("UDR"), User Entity/Equipment (Mobile Terminal) ("UE"), Uplink ("UL"), User Plane ("UP"), Universal Mobile Telecommunications System ("UMTS"), UMTS Terrestrial Radio Access ("UTRA"), UMTS Terrestrial Radio Access Network ("UTRAN"), User Service Description ("USD"), and Worldwide Interoperability for Microwave Access ("WiMAX"). As used herein, "HARQ-ACK" may represent collectively the Positive Acknowledge ("ACK") and the Negative Acknowledge ("NACK") and Discontinuous Transmission ("DTX"). ACK means that a TB is correctly received while NACK (or NAK) means a TB is erroneously received. DTX means that no TB was detected.

In Unmanned Aerial System ("UAS") communications, there are various scenarios which require the interaction between the UAV and the pilot-owner aka UAV-controller (UAV-C). One main use case for such interaction is the Command-and-Control ("C2") communication. A UAS may be configured with a C2 communication mode. According to TS 22.125 (which is the specification for the Stage 1 requirements for UAS), the configuration of the C2-mode is defined as "the user plane link to deliver messages with information of command and control for UAV operation from a UAV controller or a UTM to a UAV".

BRIEF SUMMARY

Methods for end-to-end QoS fulfillment are disclosed. Apparatuses and systems also perform the functions of the methods.

One method of a control unit includes receiving a request to manage the QoS of an end-to-end application session. Here, the end-to-end application session comprises a first session of a first UE connected to a first network and a second session of a second UE connected to a second network. The method includes configuring a first QoS parameter for the first session of the first UE and a second QoS parameter for the second session of the second UE and receiving a trigger event related to the QoS change of the second QoS parameter. The method includes determining a third QoS parameter for the first session of the first UE based on the QoS change of the second QoS parameter and communicating the third QoS parameter to the first network.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 10 is a flowchart diagram illustrating one embodiment of a method that may be used for end-to-end QoS fulfillment.

DETAILED DESCRIPTION

Figure 1:
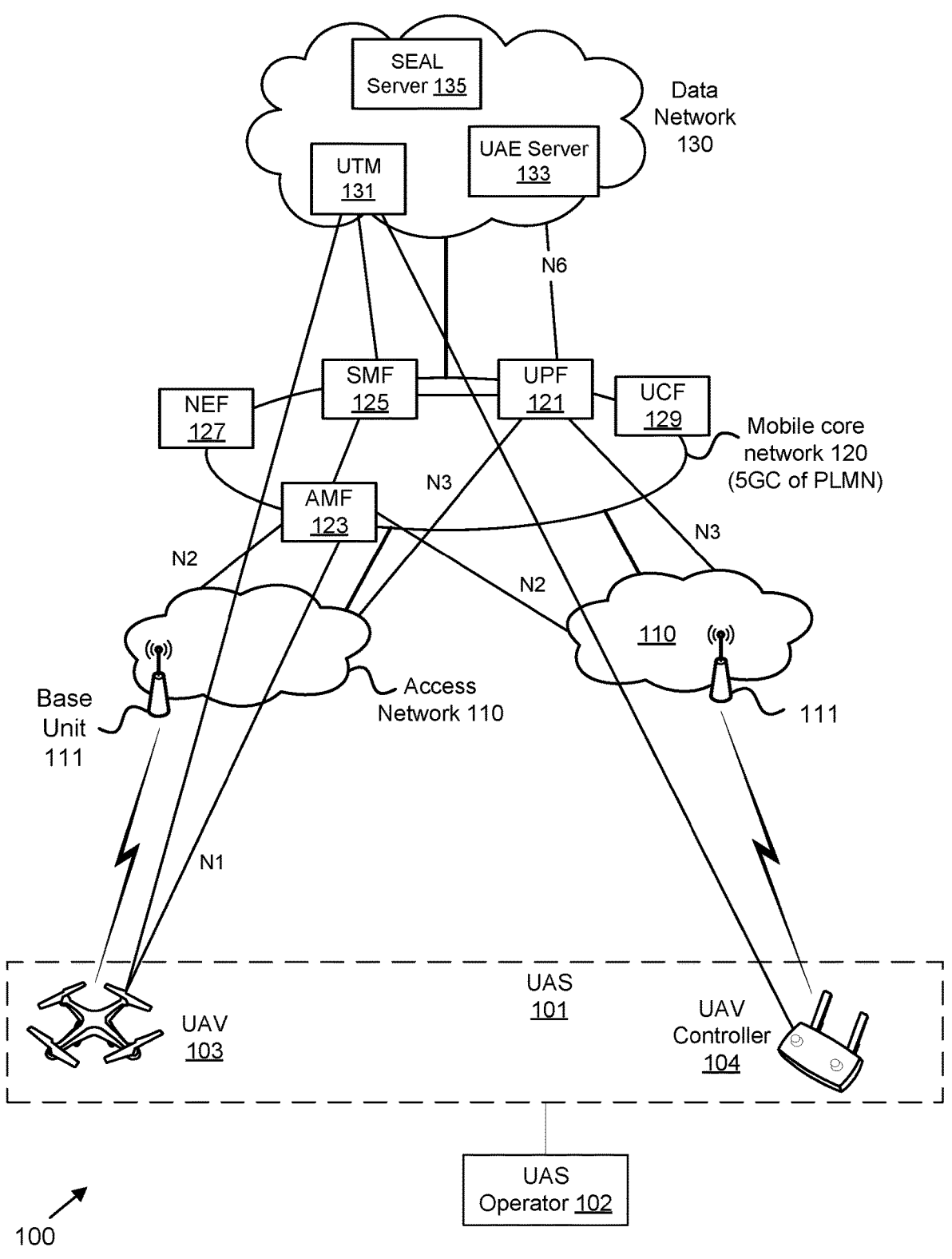
FIG. 1 is a schematic block diagram illustrating one embodiment of a wireless communication system for end-to-end QoS fulfillment.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for ensuring E2E QoS fulfilment at an indirect UAS communication. In UAS communications, there are various scenarios which require the interaction between the UAV and the pilot-owner aka UAV-controller (UAV-C). One main use case for such interaction is the Command and Control (C2) communication. Disclosed herein are solutions to assure E2E QoS fulfilment at an indirect UAS communication, which may involve dynamic changes at the QoS of one of the communication links (e.g., UAV to 5G Network link).

According to TS 22.125 (which is the specification for the Stage 1 requirements for UAS), the configuration of the C2-mode is defined as "the user plane link to deliver messages with information of command and control for UAV operation from a UAV controller or a UTM to a UAV".

During Direct C2 communication, the UAV controller and UAV establish a direct C2 link to communicate with each other and both are registered to the 5G network using the radio resource configured and scheduled provided by the 5G network for direct C2 communication.

During Network-Assisted C2 communication (aka "Indirect C2 communication"), the UAV controller and UAV register and establish respective unicast C2 communication links to the 5G network and communicate with each other via 5G network. Also, both the UAV controller and UAV may be registered to the 5G network via different NG-RAN nodes in the same or in different PLMNs. The network-assisted C2 communication needs to support certain control modes and certain KPIs (e.g. end-to-end latency and reliability) for each control mode.

During UTM-Navigated C2 communication, the UAV has been provided a pre-scheduled flight plan, e.g., an array of 4D polygons, for autonomous flying, however UTM still maintains a C2 communication link with the UAV in order to regularly monitor the flight status of the UAV, verify the flight status with up-to-date dynamic restrictions, provide route updates, and navigate the UAV whenever necessary.

The four control modes defined in TS 22.125 are (1) steer to waypoints, (2) direct stick steering, (3) automatic flight by UTM and (4) approaching autonomous navigation infrastructure. Two of these control modes require network assisted C2 communication.

Steer to waypoints: the control message contains flight declaration, e.g. waypoints, sent from the UAV controller or UTM to the UAV. The control mode is used in both of direct C2 communication and network assisted C2 communication.

Direct stick steering: the control message contains direction instructions sending from the UAV controller to the UAV while optionally video traffic is provided as feedback from the UAV to the UAV controller. The control mode is used in both of direct C2 communication and network assisted C2 communication.

One additional scenario is the Remote UAV controller through HD video. After a UAV and a UAV controller have set up association and have begun a flight task, the C2 link is established and it supports UAS operation normally. In some scenarios, e.g. UAV flying beyond the line of sight or in an emergency event, the UAV controller will be taken over by another UAV controller or by a high priority UAV controller. In this case, the C2 connection shall be set up with the new UAV controller to ensure continuous support for the flight task.

For the above control modes/scenarios, the end-to-end application QoS requirements (UAV-to-UAV-C) may vary in terms of latency (from 20 ms to 140 ms), reliability (from 99.9% to 99.99%), data rate, etc. and may be different based on whether the communication is UAV or UAV-C originated.

One key issue which relates to the C2 communication is the translation of application QoS requirements and the network QoS requirements, and the fact that multiple PDU sessions may correspond to one E2E application session (C2 application).

In particular, the solutions described herein address the problems of: a) where and how the linking/binding of PDU sessions corresponding to a C2 E2E session needs to be performed; and b) how to configure or adapt dynamically the QoS offering per PDU session to guarantee the C2 application QoS end to end fulfilment.

FIG. 1 depicts a wireless communication system 100 for end-to-end QoS fulfillment, according to embodiments of the disclosure. In one embodiment, the wireless communication system 100 includes at least one access network 110 and a mobile core network 120. As depicted, the wireless communication system 100 may include a first access network serving the UAV 103 and a second access network serving the UAV controller 104. Here, the wireless communication system 100 includes at least one core network 120 (e.g., a 5GC of a PLMN). The access network(s) 110 and the mobile core network 120 form a mobile communication network.

An Unmanned Aerial System ("UAS") 101 includes an Unmanned Aerial Vehicle ("UAV") 103, an UAV Controller 104 and related functionality, including command and control ("C2") links between the UAV 130 and the UAV Controller 104, the UAV 103 and the network, and for remote identification. The UAV controller 104 of the UAS 101 enables a pilot to control the UAV 103 (also called remotely piloted aircraft or drone) of the UAS 101. The UAS Operator 102 (i.e., pilot) is the person who operates the UAV 103 (e.g., via the UAV Controller 104). The UAV 103 and UAV controller 104 may each be UEs in the wireless communication system 100. As such, the UAV 103 and/or UAV controller 104 may communicate with an access network 110 to access services provided by a mobile core network 120.

Even though a specific number of UAVs 103, UAV controllers 104, access networks 110, and mobile core networks 120 are depicted in FIG. 1, one of skill in the art will recognize that any number of UAVs 103, UAV controllers 104, access networks 110, and mobile core networks 120 may be included in the wireless communication system 100.

Each access networks 110 contains at least one base unit 111 and may be composed of a 3GPP access network (containing at least one cellular base unit) and/or a non-3GPP access network (containing at least one access point). In various embodiments, an access network 110 is a radio access network, such as a 5G-RAN. A UE (e.g., the UAV 103 and/or UAV controller 104) may communicate with a 3GPP access network using 3GPP communication links and/or communicates with a non-3GPP access network using non-3GPP communication links.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, a UE (e.g., UAV 103 and/or UAV controller 104) may include computing devices, such as desktop computers, laptop computers, personal digital assistants ("PDAs"), tablet computers, smart phones, smart appliances (e.g., appliances connected to the Internet), game consoles, remote controllers, or the like. Moreover, the UEs may be referred to as remote units, subscriber units, mobiles, mobile stations, users, terminals, mobile terminals, fixed terminals, subscriber stations, user terminals, wireless transmit/receive unit ("WTRU"), a device, or by other terminology used in the art.

The UEs (e.g., the UAV 103 and/or UAV controller 104) may communicate directly with one or more of the base units 111 in the access network 110 via uplink ("UL") and downlink ("DL") communication signals. In some embodiments, the UL and DL communication signals are carried over the 3GPP communication links. In other embodiments, the UL and DL communication signals are carried over the non-3GPP communication links. Here, the access networks 110 are intermediate networks that provide the UAV 103 and/or UAV controller 104 with access to the mobile core networks 120.

In some embodiments, the UEs communicate with one or more UAV Traffic Management ("UTM") services via a network connection with the mobile core networks 120. As described in further detail below, the UAV 103 may establish a PDU session (or similar data connection) with the mobile core networks 120 using the access network 110. The mobile core networks 120 then relays traffic between the UE and the data network 130 using the PDU session. Note that the UE may establish one or more PDU sessions (or other data connections) with the mobile core networks 120. As such, the UE may have at least one PDU session for communicating with the data network 130. The UE may establish additional PDU sessions for communicating with other data network and/or other remote hosts.

The base units 111 may be distributed over a geographic region. In certain embodiments, a base unit 111 may also be referred to as an access point, an access terminal, a base, a base station, a Node-B, an eNB, a gNB, a Home Node-B, a relay node, a device, or by any other terminology used in the art. The base units 111 are generally part of a radio access network ("RAN"), such as access network 110, that may include one or more controllers communicably coupled to one or more corresponding base units 111. These and other elements of radio access network are not illustrated but are well known generally by those having ordinary skill in the art. The base units 111 connect to the mobile core network 120 via the access network 110.

The base units 111 may serve a number of UEs within a serving area, for example, a cell or a cell sector, via a wireless communication link. The base units 111 may communicate directly with one or more of the UEs via communication signals. Generally, the base units 111 transmit DL communication signals to serve the UEs in the time, frequency, and/or spatial domain. Furthermore, the DL communication signals may be carried over the communication links. The communication links may be any suitable carrier in licensed or unlicensed radio spectrum. The communication links facilitate communication between one or more of the UEs and/or one or more of the base units 111.

In one embodiment, the mobile core network 120 is a 5G core ("5GC") or the evolved packet core ("EPC"), which may be coupled to a data network (e.g., the data network 130), such as the Internet and private data networks, among other data networks. A UE may have a subscription or other account with the mobile core network 120. Each mobile core network 120 belongs to a single public land mobile network ("PLMN"). The present disclosure is not intended to be limited to the implementation of any particular wireless communication system architecture or protocol.

The mobile core network 120 includes several network functions ("NFs"). As depicted, the mobile core network 120 may include one or multiple user plane functions ("UPFs") 121. The mobile core network 120 also includes multiple control plane functions including, but not limited to, an Access and Mobility Management Function ("AMP") 123, and a Session Management Function ("SMF") 125, and a Network Exposure Function ("NEF") 127. In certain embodiments, the mobile core network 120 may also include an Authentication Server Function ("AUSF"), a Policy Control Function ("PCF"), and a Unified Data Management function ("UDM"), a Network Repository Function ("NRF") (used by the various NFs to discover and communicate with each other over APIs), or other NFs defined for the 5GC. In certain embodiments, the mobile core network 120 may include a AAA server.

In various embodiments, the mobile core network 120 supports different types of mobile data connections and different types of network slices, wherein each mobile data connection utilizes a specific network slice. Here, a "network slice" refers to a portion of the mobile core network 120 optimized for a certain traffic type or communication service. A network instance may be identified by a S-NSSAI, while a set of network slices for which the UE (e.g., UAV 103 and/or UAV controller 104) is authorized to use is identified by NSSAI. In certain embodiments, the various network slices may include separate instances of network functions, such as the SMF 125 and UPF 121. In some embodiments, the different network slices may share some common network functions, such as the AMF 123. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 120. Moreover, where the mobile core network 120 is an EPC, the depicted network functions may be replaced with appropriate EPC entities, such as an MME, S-GW, P-GW, HSS, and the like.

In the following descriptions, the term gNB is used for the base station but it is replaceable by any other radio access node, e.g., BS, eNB, gNB, AP, NR, etc. Further the operations are described mainly in the context of 5G NR. How-ever, the proposed solutions/methods are also equally applicable to other mobile communication systems supporting serving cells/carriers being configured for UAS operation.

As depicted, a UE (e.g., the UAV 103 and/or UAV controller 104) may connect to the mobile core network (e.g., to a 5G mobile communication network) via an access network 110. Connecting to the mobile communication network (e.g., a combination of access network and mobile core network) allows the UAV 103 to operate at increased distances from the UAV controller 104 and does not require a line-of-sight connection between the UAV 103 and UAV controller 104.

Generally, the UAS 101 may interact with one or more UAV traffic management ("UTM") services 131 when operating the UAV 103 and/or filing flight plans. In various embodiments, each mobile core network 120 that supports UAV operation is able to communicate with one or more UTMs 131.

The UTM 131 is an element that manages UAV operation for one or multiple UAVs 103 and UAV controller 104. In various embodiments, a UTM 131 monitors UAVs 103 and UAV Controllers 104 operating in a specific uncontrolled airspace (e.g., below 400 feet above the ground). Managing UAV operation may include providing flight authorizations, performing collision avoidance, determining alternative flight routes, ensuring that UAV operation remains within authorized limits, etc. In various embodiments, the operation of a UTM is similar to the operation of an Air Traffic Controller (ATC), which manages manned aircrafts on the ground and in controlled airspace (above 400 feet).

In many scenarios, a UAV controller 104 establishes a connection to a UAV 103 via one or more 5G systems, operated by the same or different mobile network operators. For example, the UAV controller 104 may establish a data connection to the UAV 103 via the access network 110 and the core network 120. When the UE (e.g., one of the UAV 103 and UAV controller 104) requests to establish a data connection (e.g., a PDU session) for UAV operation, the SMF 125 selects a UTM 131 and verifies the UAV operation.

The UTM 131 may send a request to a UAE server 133 to manage the quality of service of a C2 communication session for a UAS 101, as discussed in further detail below with reference to FIGS. 2, 3A-3B, and 4A-4B. The UAE server 133 collects information to aid in determining whether to dynamically adapt a C2 communication quality of service parameter of the UAS 101. Additionally, the UAE server 133 may receiving location and other information from a Service Enabler Application Layer (SEAL) server 135.

The SEAL server 135 provides on-demand (subscription or request) services for all vertical enabler layer (aka middleware) platforms (e.g., UAE servers 133). Vertical specific support functionalities between the application specific servers and the mobile core network 120. Common support functionalities (Service Platform enabling common capabilities for quicker onboarding of new Verticals) include Location Management, Group Management, Network Resource Management, Configuration Management Servers, etc., and can be used as services to vertical specific enablers.

The UAV Control Function ("UCF") 129 is a functionality to process location information from network. The UCF 129 can be a network function within the mobile core network 120 (i.e., 5GC), or an application function (AF) external to the mobile core network 120 which interacts with the mobile core network 120 via the NEF 127.

Note the while the below descriptions consider the mobility of the UAV 103, but assume the UAV controller 104 to remain stationary, in other embodiments the mobility of the UAV controller 104 may require the system 100 to consider the changing radio link conditions of the UAV controller 104 due to mobility, interference, etc.

In the UTM-Navigated C2 mode, the UTM 131 acts as the UAV-C 104 for the UAV 103 and establishes a C2 communication session with the UAV(s) 103 via the mobile core network 120 (and access network 110). Via the mobile network connection, the UTM 131 sends flight instructions to the UAV(s) 103. Note that the UTM-Navigated C2 mode does not require line-of-sight between the UAV-C 104 and the UAV(s) 103.

In the Indirect C2 mode, the UAV-C 104 establishes a C2 communication session with the UAV(s) 103 via the mobile core network 120 (and access network 110). Via the mobile network connection, the UAV-C 104 may send flight instructions to the UAV(s) 103. Note that the Indirect C2 mode does not require line-of-sight between the UAV-C 104 and the UAV(s) 103.

Figure 2:
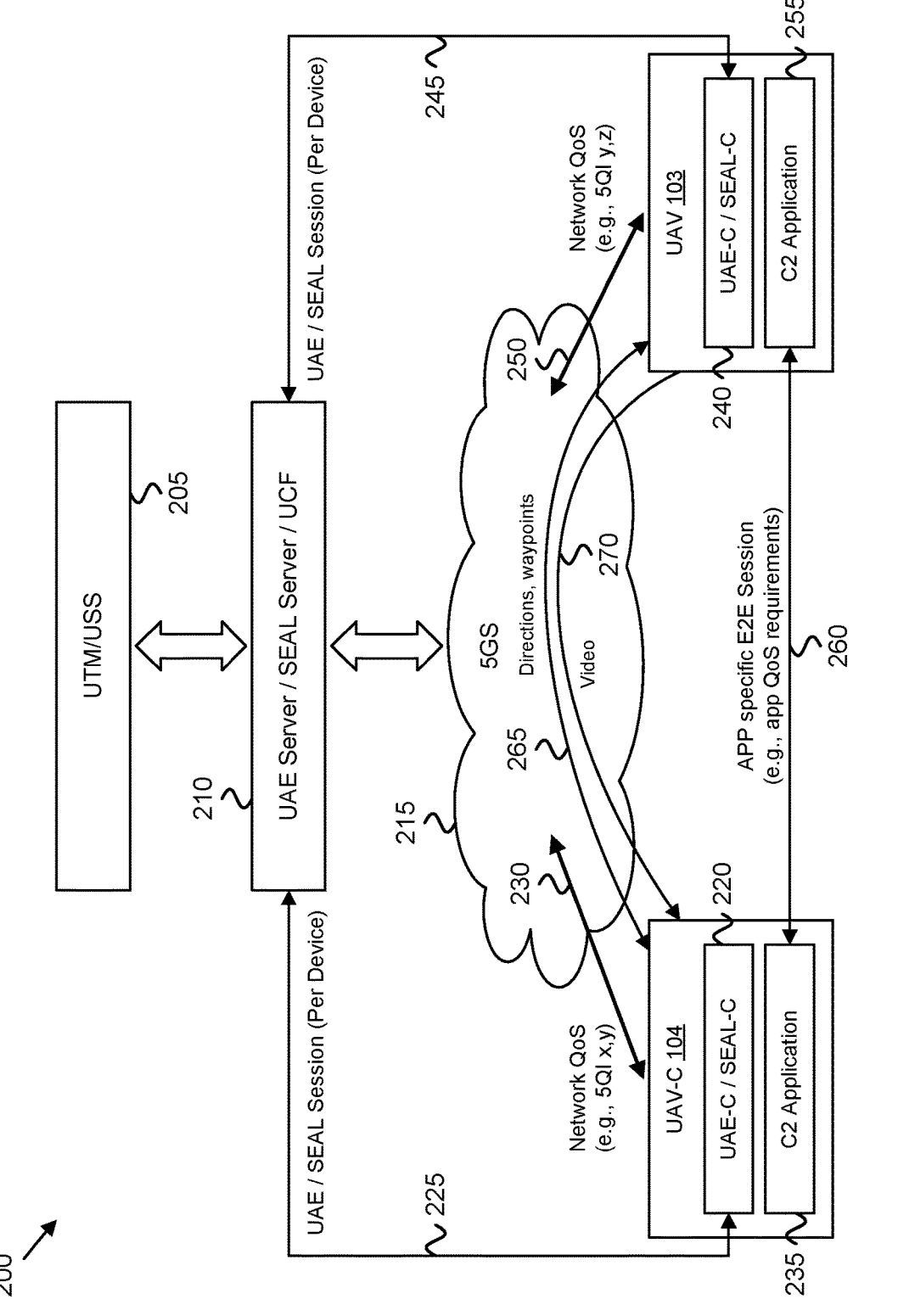
FIG. 2 is a diagram illustrating one embodiment of a network architecture for end-to-end QoS fulfillment.

FIG. 2 depicts a network architecture 200 for end-to-end QoS fulfillment, according embodiments of the disclosure. The network architecture 200 includes an instance of the UAV 103, an instance of the UAV-C 104, a UTM/USS 205, a UAE Server and/or SEAL Server and/or UCF 210, and a 5GS 215. The UAV 103 includes a middleware layer with a UAE client and/or SEAL client 240 and a C2 application 255. The UAV-C 104 includes a middleware layer with a UAE client and/or SEAL client 220 and a C2 application 235.

The UTM is air traffic management ecosystem for UAS, comprising a set of functions and services for managing a range of autonomous vehicle operations (e.g. authenticating UAV, authorizing UAS services, managing UAS policies, and controlling UAV traffics in the airspace). UTM services are defined outside the 3GPP system and subject to specific regional requirements. The USS is part of UTM and is the service provider for the UAS. A USS provides services to support the safe and efficient use of airspace by providing services to the operator/pilot of a UAS in meeting UTM operational requirements. One or more USS(s) may be present in a specific region and may manage UAVs over one or more 3GPP networks. The 3GPP network may provide to UTM/USS 205 the UAV/UAV-C location information and may support UTM to establish an association between UAV 103 and UAV-C 104. Furthermore, one of the UTM services is to provide infrastructure and quality of service assurance for radio frequency (RF) Command and Control (C2) capabilities to UAS Operators.

As depicted, the UAE-C/SEAL-C 220 may establish a UAE and/or SEAL Session 225 with the UAE-S/SEAL-S/UCF 210. Similarly, the UAE-C/SEAL-C 240 may also establish a UAE and/or SEAL Session 245 with the UAE-S/SEAL-S/UCF 210. A UAE/SEAL session refers to the application session which is established between a UAE/SEAL server and a UAE/SEAL client at the UAV and UAV-C, which deploy UAE/SEAL clients, in order to interact with the UAE/SEAL server.

Additionally, the C2 application 235 may establish an Application-specific End-to-End ("E2E") session 260 with the C2 application 255. Note that the Application-specific E2E session 260 has associated application QoS requirements. The Application-specific E2E session 260 represents a session between the C2 application of the UAV and the C2 application of the UAV-C and/or the UTM/USS 205 (in UTM-navigated C2 communication).

The UAV-C 104 establishes a network connection 230 with the 5GS 215. Note that the network session 230 has associated network QoS requirements (shown as 5QI 'x', 'y'). The UAV 103 establishes a network connection 250 with the 5GS 215. Note that the network session 250 has associated network QoS requirements (shown as 5QI 'z'). As discussed above, the UAV 103 and UAV-C 104 communicate directions and/or waypoints 265 via the 5GC 215. Similarly, the UAV 103 may send video data 270 to the UAV-C 104.

In network assisted C2 communication, the following considerations are made:

1) it is assumed that both UAV and UAV-C are connected to one or more 3GPP networks. In this case, two PDU sessions need to be established for the C2 communication, and in particular: 1) a UAV-C PDU Session and 2) a UAV PDU Session. At the network side, there is no mechanism for linking these two PDU sessions for joint QoS monitoring and configuration.

2) it is assumed that each of these PDU sessions may have one or more QoS profiles based on the traffic requirements. One example for multiple QoS profiles is the Direct Stick C2 mode, where the UAV-C provides directions to UAV (associated with one QoS profile) and the UAV provides to UAV-C a video feed (associated with another QoS profile). In this scenario, each PDU session needs at least 2 QoS profiles: one for the Command and Control messages and one for the video transfer.

3) it is assumed that the UAV-C 104 may be a mobile UE and may be connected to different access network or even to different PLMN than the UAV 103.

As example, if the E2E latency for C2 communication is 40 ms, then each PDU Session (one for UAV and one for UAV-C) can be configured with a delay critical GBR QoS flow with delay budget, e.g., 10 ms (see 5QI=82 or 83). The 3GPP network makes sure that the GBR flow of UAV and the GBR flow of UAV-C meet the delay requirement of 10 ms. When the delay of the GBR flow used by UAV exceeds a threshold (e.g. >30 ms), the UAV-C may request a smaller delay for its own GBR flow (e.g. 5QI 85), so that the overall delay does not exceed 40 ms. However, such mechanism for coordinating the QoS attributes of two dependent sessions does not exist.

Figure 3:
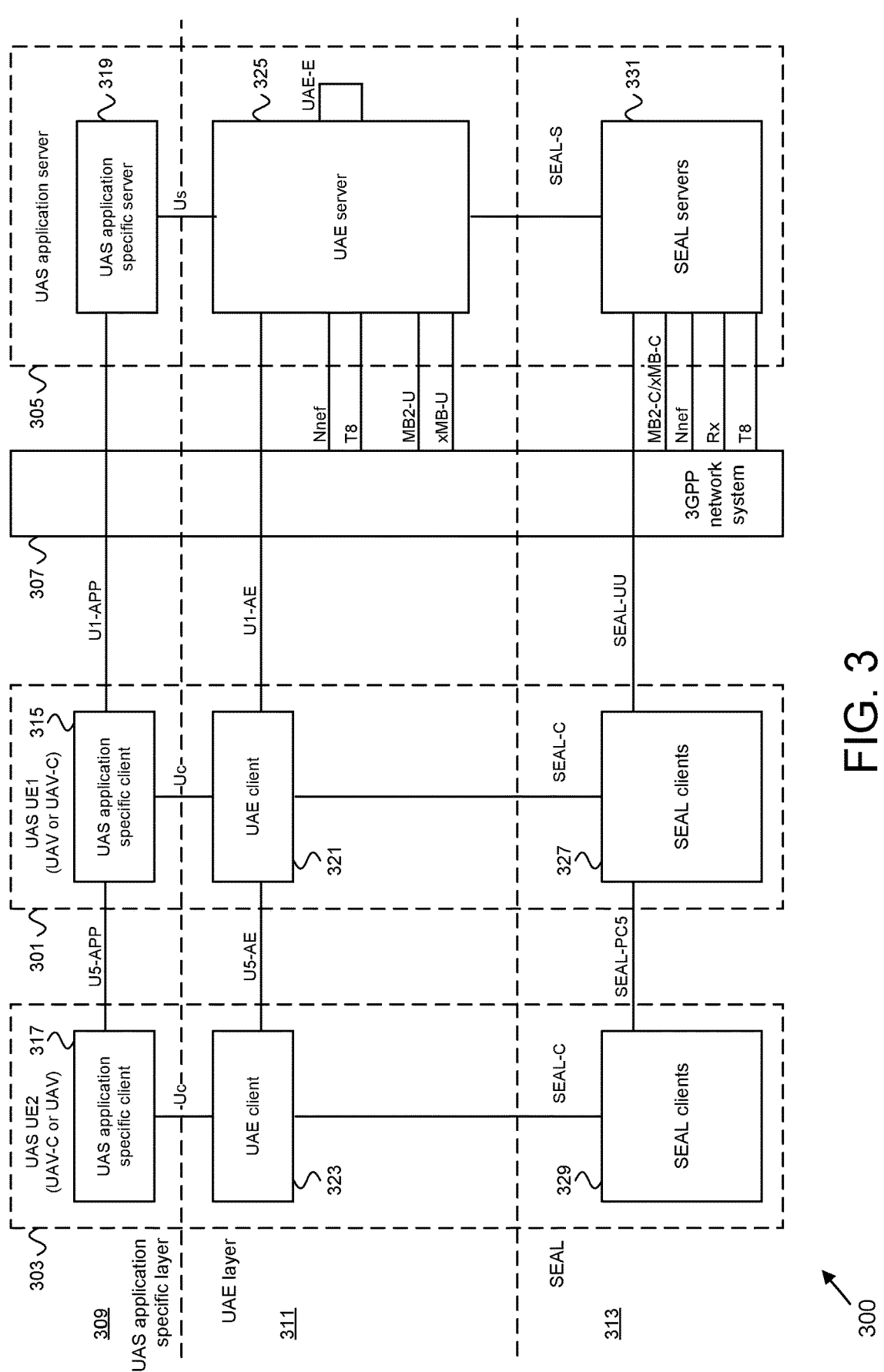
FIG. 3 is a diagram illustrating one embodiment of a UAS application layer functional model.

FIG. 3 depicts a UAS application layer functional model 300, according embodiments of the disclosure. The UAS application layer functional model 300 includes a first UAS UE 301 (e.g., a UAV-C or UAV) and a second UAS UE 303 (e.g., UAV or UAV-C) which interact with a UAS application server 305 via a 3GPP network system 307. The UAS application layer functional model 300 includes at least a UAS application-specific layer 307, a UAE layer 309, and a SEAL layer 311. At each layer, the UAS UEs 301, 303 include a client which interacts with a corresponding server at the UAS application server.

The first UAS UE 301 comprises the UAE clients 321, the SEAL clients 327 and the UAS application specific client 315. The second UAS UE 303 comprises of the UAE clients 323, the SEAL clients 329 and the UAS application specific client 317. The UAS application server 305 comprises the UAE server 325, the SEAL servers 331 and the UAS application specific server 319.

The UAS application specific layer 309 comprises the UAS application specific functionalities. The functionalities of the UAS application specific layer 309 include the USS/UTM 205. In the UAS application specific layer 309, the UAS application specific client 317 of the second UAS UE 303 communicates with the UAE client 315 of the first UAS UE 301 over the U5-APP reference point. The UAS application specific clients 315, 317 communicate with the UAS application specific server 319 over the U1-APP reference point. Note that the U1-5 APP reference point includes UAV-Controller/UAV to USS/UTM communication.

The UAE layer 311 offers the UAE capabilities to the UAS application specific layer 307. The UAE clients 321, 323 provide UAS application layer support functions to the UAS application specific clients 315, 317 over the Uc reference point. The UAE server 325 provides UAS application layer support functions to the UAS application specific server 319 over the Us reference point.

In the UAE layer 311, the UAE client 323 of the second UAS UE 303 communicates with UAE client 321 of the first UAS UE 301 over the U5-AE reference point. The UAE clients 321, 323 communicate with the UAE server 325 over the U1-AE reference point. To support distributed UAE server deployments, the UAE server 325 interacts with another UAE server 325 over UAE-E reference point. The UAE server 325 interacts with the 3GPP network system over U2, MB2, xMB, Rx, T8 and Nnef reference points.

A U1-AE message may be sent over at least unicast, and may be sent over transparent multicast via xMB or transparent multicast via MB2. Non-transparent multicast via xMB (as specified in 3GPP TS 26.348) is triggered by a U1-AE message. Multicast distribution may be supported by both transparent and non-transparent multicast modes.

The UAE clients 321, 323 interact with the SEAL clients 327, 329 over the SEAL-C reference point specified for each SEAL service. The UAE server 325 interacts with the SEAL servers 331 over the SEAL-S reference point specified for each SEAL service. The interaction between the SEAL clients 327 and 329 is supported by the SEAL-PC5 reference point specified for each SEAL service. The interaction between a SEAL client 327, 329 and the corresponding SEAL server 331 is supported by the SEAL-UU reference point specified for each SEAL service. Note that the SEAL-C, SEAL-S, SEAL-PC5, SEAL-UU reference points for each SEAL service is specified in 3GPP TS 23.434.

The SEAL services utilized by UAE layer 311 may include location management, group management, configuration management, identity management, key management and network resource management. In some deployments, the SEAL client and server entities 327, 329 and 331 may be part of the UAE clients 321, 323 and the UAE server 325 respectively.

The UAE and SEAL layers 311, 313 provide support functionalities for the UAS acting as a middleware logical entity between UTM/USS (e.g., UAS application server 305) and the underlying 3GPP network(s). SEAL is a common set of functionalities (including Location Management, Network Resource Management, Configuration Management, . . . ) which may support the UTM/USS for simplifying and optimizing the interactions with the network.

Figure 4:
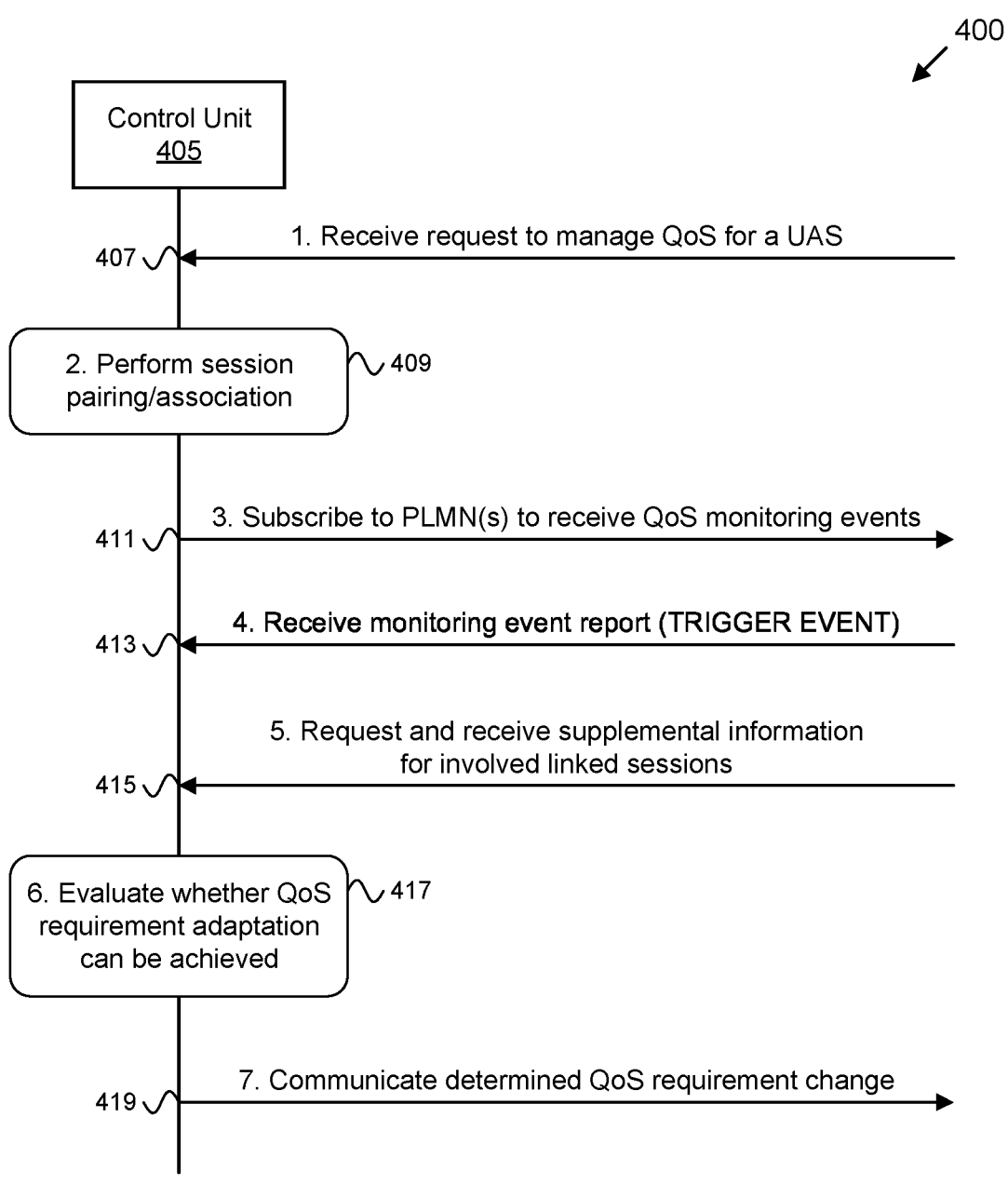
FIG. 4 is a diagram illustrating signaling flow for one embodiment of a procedure for managing the QoS assurance for C2 communications.

FIG. 4 depicts a procedure 400 for managing the QoS assurance for C2 communications. The procedure 400 is performed by a control unit 405, which can take the form of an application function (AF) and/or vertical enabler server. The procedure 400 assumes that both the UAV and UAV-C have established PDU sessions with the same or different PLMN for C2 communication. To solve the problems of where and how the linking/binding of PDU sessions corresponding to a C2 E2E session needs to be performed, and also how to configure or adapt dynamically the QoS offering per PDU session to guarantee the C2 application QoS end to end fulfilment, the procedure 400 performs the following steps:

At step 1, the control unit 405 receives a request to manage QoS for a UAS from the application enabler client (i.e., UAE-C or SEAL-C) of the UAV or the UAV-controller while the UAV flight is ongoing (see messaging 407). Alternatively, the request to manage QoS for a UAS may come from a UTM. This request may include the application ID or UAS ID, the UAV ID (PEI/IMEI, GPSI), PLMN ID(s), a high-definition ("HD") location map, the allowed route of the UAV, C2 KPI requirements and mode of command/control.

At step 2, in response of receiving the request, the control unit 405 performs a pairing/association of the UAV, UAV-C sessions corresponding to the application ID/UAS ID (see block 409). This pairing/linking can be in the form of translation of the UAS ID/application ID to a group ID or to two (linked) AF-Service-Identifiers (one for UAV and one for UAV-C) or two (linked) session IDs, for the interaction with the underlying PLMN(s). As used herein, an AF-Service-Identifier refers to an identifier of the service on behalf of which the AF is issuing a request to 5GC. This is used to describe the traffic of the C2 application at the UE.

At step 3, upon pairing/associating the UAV-UAV-C, the control unit 405, acting as AF, subscribes to the PLMN(s) to receive QoS monitoring events for both the PDU sessions corresponding to the UAV and the UAV-C; and in particular to receive QoS Notification Control [TS 23.501] if a QoS downgrade is captured at one of the C2 links (failure to meet the GBR QoS requirements) (see messaging 411).

At step 4, a monitoring event report (i.e., Trigger Event) is received at the control unit 405 by the 5GC or optionally by the application enabler client of the UAV (see messaging 413). For example, the monitoring event report may denote a QoS downgrade notification for one of the PDU sessions (e.g., QoS notification control for the UAV session or a notification that a QoS flow will downgrade to a lower priority QoS profile).

At step 5, the control unit 405 requests and receives supplement information for the involved linked sessions, e.g., for the UAV-C session, and in particular the network QoS status and an indication of the access conditions which can be used to identify whether QoS can be upgraded (messaging 415). This can be provided by the 5GC or by SEAL/NRx server.

At step 6, the control unit 405 evaluates/checks whether a QoS requirement adaptation can be achieved for the involved communication sessions, by upgrading the QoS requirement for the PDU session which is not affected by the QoS degradation; so as to avoid failing to meet the end-to-end C2 application requirement (see block 417). If such adaptation can be achieved, the control unit determines the application QoS requirement change for each of the UE sessions; and triggers for PCC rule adaptation (QoS profile change) for one or more sessions within the C2 application.

At step 7, the control unit 405 communicates the determined change to the one or more involved entities (see messaging 419). This involves the service specific parameter provisioning update to PCF/SMF via NEF, with different QoS profiles for the involved network sessions (one downgraded and one upgraded).

Described herein are two cases for the communication with the network(s) when the new QoS is determined: one for notification control with Alternative QoS profiles for the QoS flows (5.7.2.4.1b of 23.501) and one for notification control without Alternative QoS profiles (5.7.2.4.1b of 23.501). If Alternative QoS profiles are set in advance by the AF, for the first case, the QoS flow will downgrade at the network side to the lower priority QoS based on the initial configuration (so the control unit will only update the upgraded QoS, and will not decide on the QoS requirements adaptation for the downgraded flow); whereas for the second case, the control unit will determine the updated requirements for both QoS flows corresponding to the two sessions.

Figure 5A:
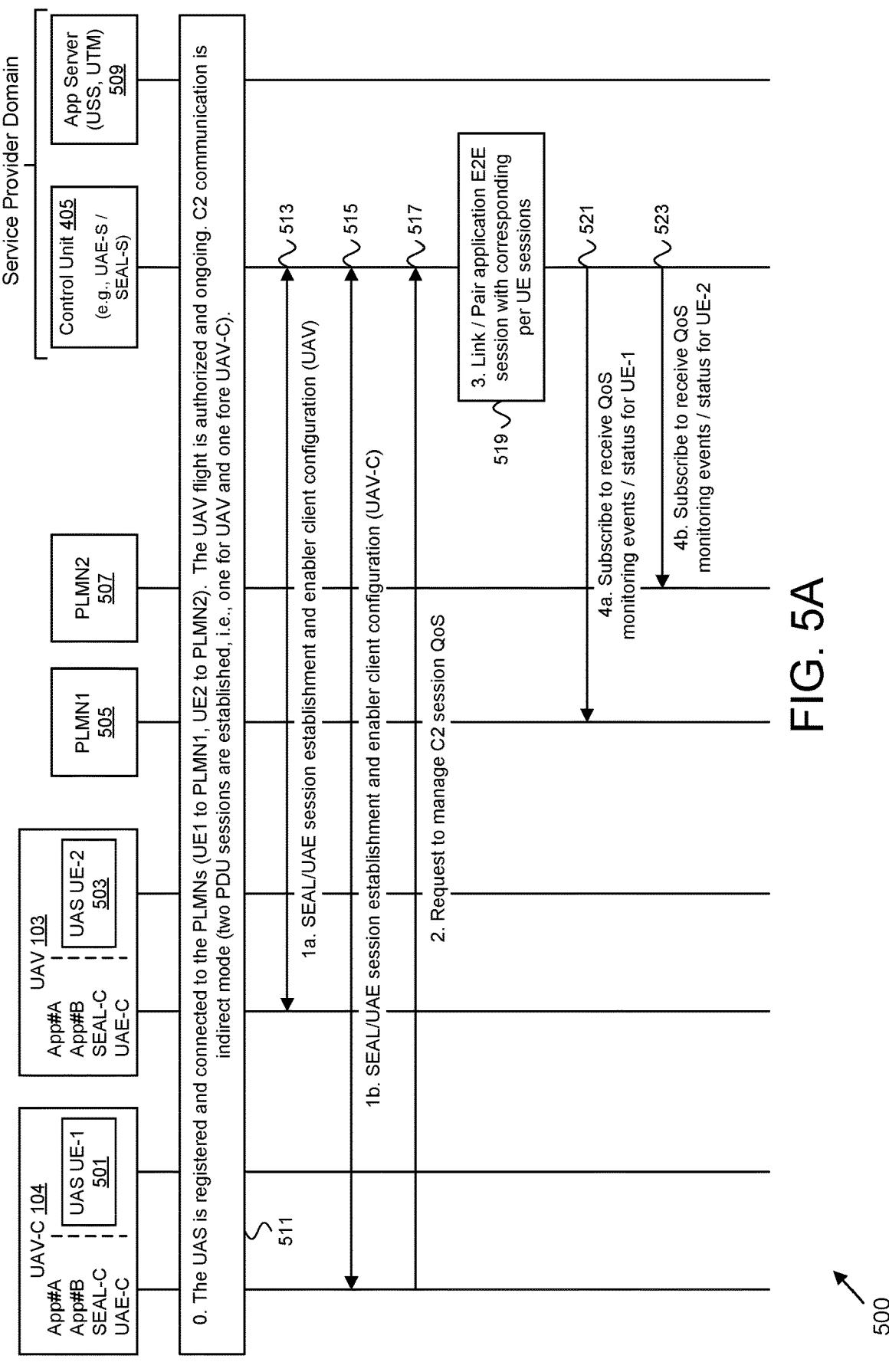
FIG. 5A is a diagram illustrating signaling flow for one embodiment of a procedure for Network-triggered joint QoS adaptation where the functionality is enabled by the UE.
Figure 5B:
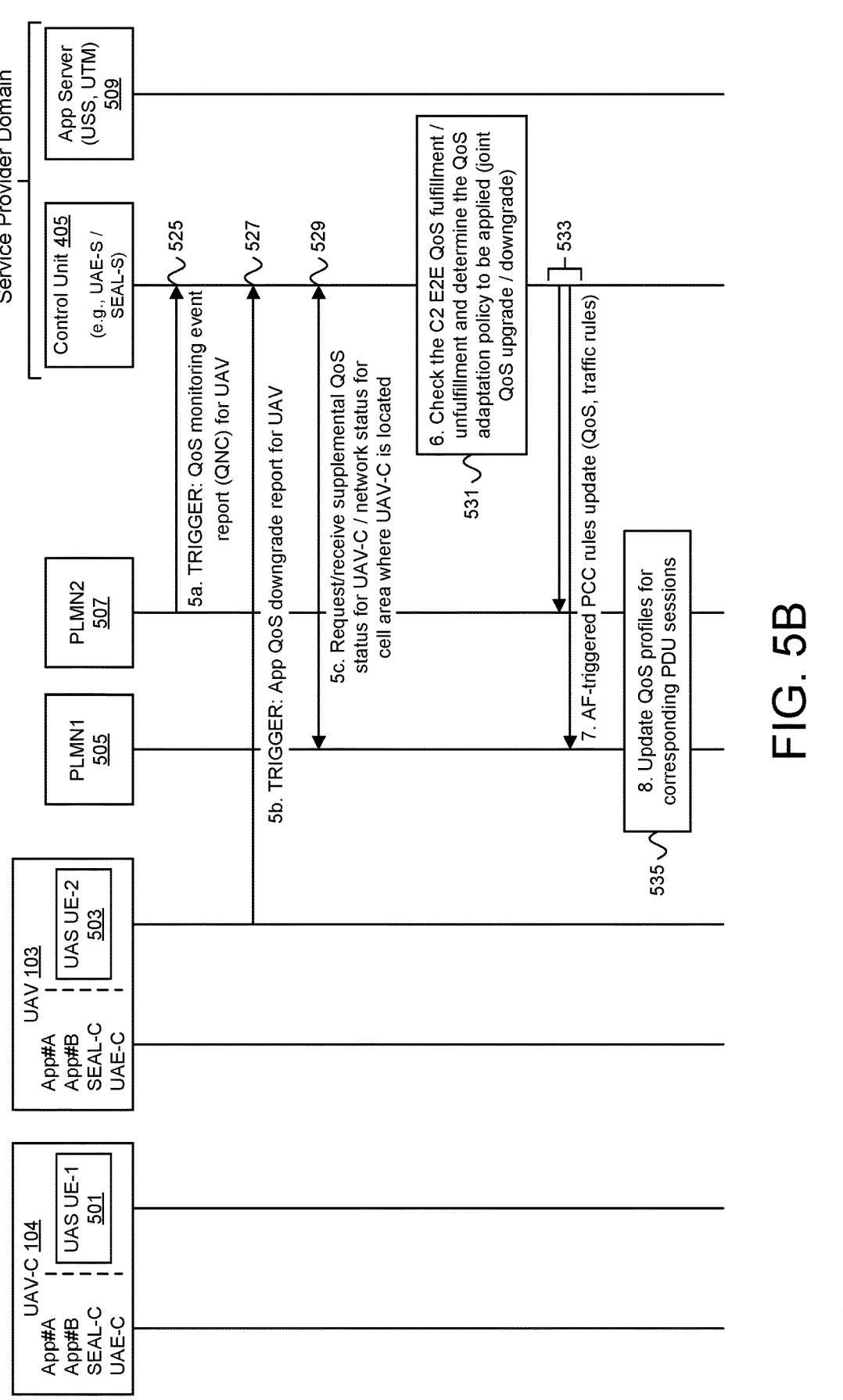
FIG. 5B continues the procedure of FIG. 5A.

FIGS. 5A-5B depict a procedure 500 for Network-triggered joint QoS adaptation (functionality enabled by the UE), according to embodiments of the disclosure. The procedure 500 involves the UAV-C 104 (comprising one or more application clients and a first UAS UE 501), the UAV 103 (comprising one or more application clients and a second UAS UE 503), and a service provider domain comprising the control unit 405 and at least one application server (e.g., USS and/or UTM).

In the depicted embodiment, the control unit 405 resides at the UAE server of any SEAL server (NRx, CM). Initially, the application enabler client (UAE-C/SEAL-C) at the UAV or the UAV-C sends a request to the application enabler server (UAE-S/SEAL-S) to monitor and manage the end-to-end application QoS for the C2 communication. This triggers the UAE-S/SEAL-S to subscribe to the corresponding PLMNs for receiving QoS monitoring events for both PDU sessions (one for UAV and one for UAV-C).

The QoS monitoring event may be a QoS notification control which alerts for a QoS downgrade indication to a level in which the GBR QoS requirements cannot be met. When a QoS monitoring event is received by the UAE-S/SEAL-S, the UAE-S/SEAL-S checks whether the QoS of the other link can be upgraded and how, in order to meet the end-to-end C2 requirements. If such upgrade can be feasible and is able to compensate for the QoS downgrade of the other PDU session, the updated QoS requirements are sent to the underlying PLMN(s) for one or both sessions. The procedure 500 comprises the following steps:

At Step 0, as a precondition the UAS is registered and connected to the PLMNs. In the depicted embodiment, the first UAS UE 501 is connected to a first PLMN 505 and the second UAS UE 503 is connected to a second PLMN 507. The first PLMN 505 and second PLMN 507 may be the same PLMN and/or different PLMN. C2 communication is assumed to be indirect/network-assisted; hence two PDU sessions are established, respectively. The UAE-S/SEAL-S interacts with the corresponding UAE/SEAL clients to establish individual application sessions for application registration and context transfer.

At Step 1*a*, the control unit 405 (i.e., UAE/SEAL server) sends to the UAE/SEAL client in the UAV-C 104, a C2 UAE session establishment request message (see messaging 513). In various embodiments, the C2 UAE session establishment request message includes a request to UAE/SEAL client to send a first report to the control unit 405 when a first condition occurs and comprises at least one of the following: (UAS/UAV/UAV-C identification as Step 1*a*, UAE server ID(s) which can be the FQDN or IP address, one or more application specific requirements, geographical area, time for session validity, transaction ID, location and capabilities of one or more UAVs in proximity, location and configuration of UAV-C).

At Step 1*b*, the control unit 405 also sends to the UAE/SEAL client in the UAV 103, the C2 UAE session establishment request message as described above (see messaging 515). In response of receiving the requests, the UAE/SEAL clients send C2 UAE session setup response/result message (ACK/NACK) back to the control unit 405.

At Step 2, the control unit 405 receives from the UAE/SEAL client a request for managing the QoS for the C2 application session. This request message provides to the control unit 405 the capability to manage C2 communication and includes at least one of the following parameters:

UAS identification

UAV/UAV-C identification. This may include at least one of the following: external UE identifiers (GPSI, external ID) or permanent device identifiers (PEI/IMEI)

UAV/UAV-C IP address and port [how is it known?]

PLMN ID(s)

Application identifier (e.g. USS identifier), UTM identifier

C2 control mode (direct stick, stick to waypoints), C2 KPIs

Geographical area where the requirement applies

Time of validity for the requirement

C2 E2E QoS parameters

Use of HD video flag, required video resolution/encoding

A HD location map

Allowed route of the UAV

At Step 3, the control unit 405 upon receiving the necessary authorization and information for managing C2 QoS, links the per UAS request to the two corresponding PDU sessions (UAV to PLMN1 and UAV-C to PLMN2 (or PLMN1)) (see block 519). This triggers the translation from UAS ID/application ID to a group ID or to two (linked) GPSIs or two (linked) AF-Service-Identifiers or two (linked) session IDs (one for UAV and one for UAV-C). This mapping is stored at the control unit 405 for further interactions with the 5GS.

At Steps 4*a*/4*b*, the control unit 405 acting as AF, subscribes to 5GC/NEF per each AF-Service-Identifier or session ID for the UAV and UAV-C session to receive QoS and network monitoring events (see messaging 521, 523). In the depicted embodiment, the procedure 500 shows different PLMNs as possible implementation, but this request may also be possible to single PLMN. This monitoring information is related to possible QoS downgrade of one or more Uu links (UAV-C to Network Server or Network to UAV). These links may be provided by more than one PLMNs. So, the UAE server should receive every updated information on possible QoS downgrade (this is already supported for EPS, with Explicit Congestion Notification (ECN) [e.g., as described in TS 23.401], and for 5GS with QoS notification control (QNC) [e.g., as described in TS 23.501]).

Continuing on FIG. 5B, at Step 5*a*, the control unit 405 at UAE/SEAL server receives a trigger event from the 5GC (SMF/NEF), denoting a QoS change (experienced or expected) (see messaging 525). This message includes at least one of the following parameters:

UAV ID

Application ID (e.g., C2 App #A)

Expected degraded QoS parameters (latency, reliability, data rate, jitter, . . . )

Actual degraded QoS parameters (latency, reliability, data rate, jitter, . . . )

Network status information (per TA/cell area)

QoS profile downgrade indication

At Step 5*b* (Optional), a trigger event from the application enabler client of the UAV, denoting an application QoS change (experienced or expected) which meet the trigger conditions as provided in Step 1*a*/1*b* (see messaging 527). This trigger criterion can be based on the experienced packet delay or packet loss for the Uu link (e.g., channel loss>X %) based on the configuration of the trigger. This message includes at least one of the following parameters:

UAV ID

Application ID (e.g., C2 App #A)

Cause for trigger (e.g., QoS degradation, UE context change (location/mobility))

Expected degraded QoS parameters (latency, reliability, data rate, jitter, . . . )

Actual degraded QoS parameters (latency, reliability, data rate, jitter, . . . )

UAV expected/actual location/mobility

High interference indication (by multiple BSs)

Note that the Step 4a subscription for UAV-C may be performed before the trigger event (5a/5b) or after the trigger event, based on implementation.

At Step 5c, the control unit 405 sends a request to 5GC (SMF/NEF), to receive supplement QoS information for the UAV-C (see messaging 529). This request includes at least one of the following parameters:

UAS ID/UAV ID

Application ID (e.g., C2 App #A)

Configuration of report parameters

Based on this request, the control unit 405 receives a report (via N33) with the requested parameters:

UAS ID/UAV ID

Application ID (e.g., C2 App #A)

UAE/SEAL ID

Expected QoS parameters (latency, reliability, data rate, jitter, . . . )

Actual QoS parameters (latency, reliability, data rate, jitter, . . . )

QoS upgrade capability indication

At Step 6, the control unit 405 at UAE/SEAL server, in response of receiving the report in Step 5b, checks the fulfilment/unfulfillment of the E2E QoS based on the trigger event and the UAV-C additional information (see block 531). This is performed by matching the estimated application QoS per link to the composed E2E application QoS metrics. Then, the control unit 405 at UAE/SEAL server, determines an action, based on the evaluation of the E2E QoS. This action can the QoS adaptation of both links (QoS profile downgrade for the link receive QoS notification control, and QoS upgrade for the link which can be upgraded).

At Step 7, the control unit 405, acting as AF, sends to the 5GC (to SMF via NEF or to PCF via N5) a request for a change of the QoS profile mapped to the one or both network sessions (UAV, UAV-C) or the update of the PCC rules to apply the new traffic policy (both AF triggered actions are supported in TS 23.501/502) (see messaging 533).

At Step 8, the PLMN(s) update QoS profiles for the corresponding PDU sessions (see block 535).

Figure 6A:
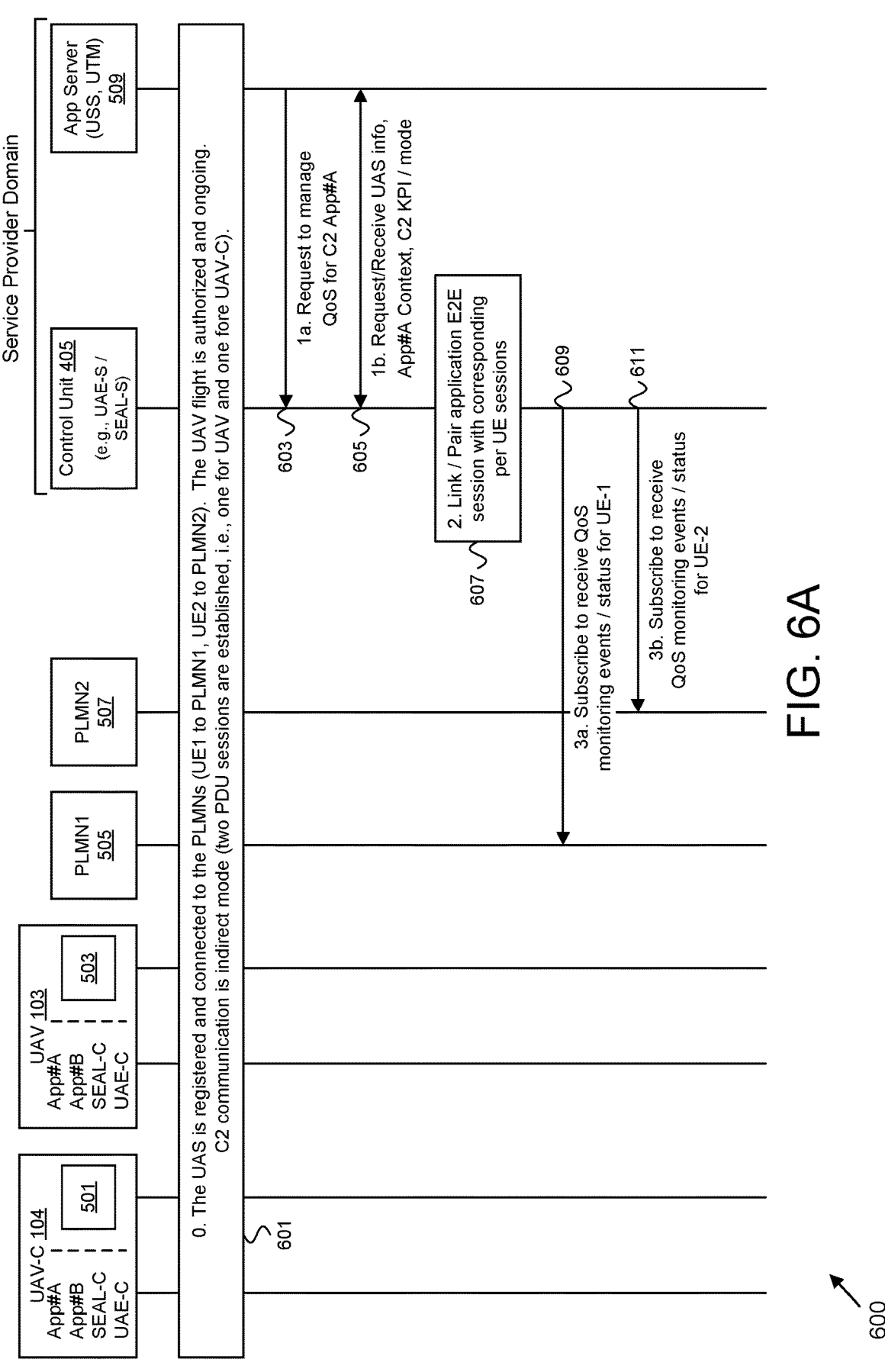
FIG. 6A is a diagram illustrating signaling flow for one embodiment of a procedure for Network-triggered joint QoS adaptation where the functionality is enabled by UTM.
Figure 6B:
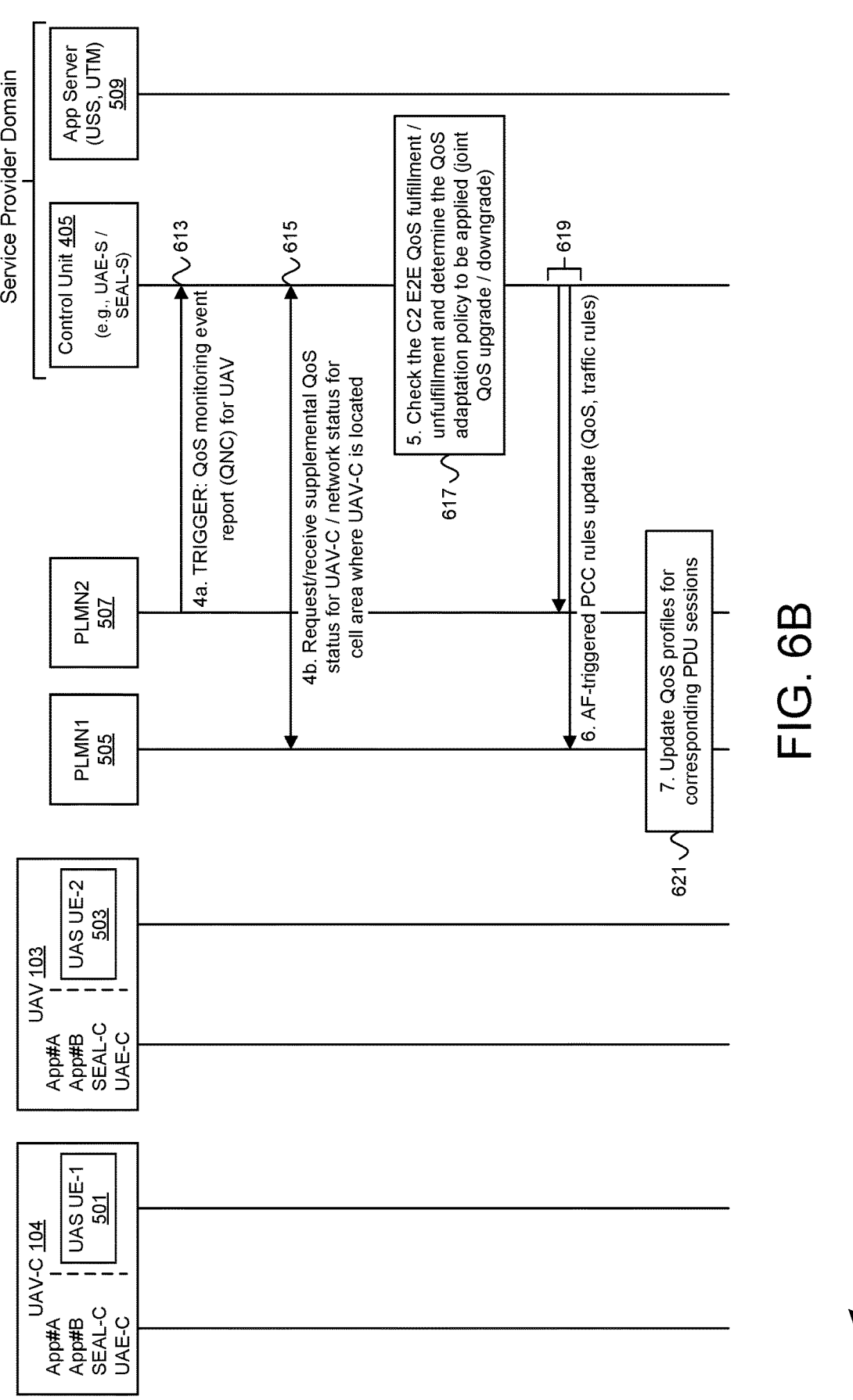
FIG. 6B continues the procedure of FIG. 6A.

FIGS. 6A-6B depicts a procedure 600 for Network-triggered joint QoS adaptation (functionality enabled by the UTM), according to embodiments of the disclosure. The procedure 600 involves the UAV-C 104 (comprising one or more application clients and a first UAS UE 501), the UAV 103 (comprising one or more application clients and a second UAS UE 503), and a service provider domain comprising the control unit 405 and at least one application server (e.g., UTM) 509.

In this embodiment, the control unit 405 resides at the UAE server or any SEAL server (NRx, CM). At step 0, as a precondition it is assumed that the UAV flight is ongoing, and both the UAV and UAV-C are connected to 3GPP network. In the depicted embodiment, the first UAS UE is connected to a first PLMN and the second UAS UE is connected to a second PLMN. The first PLMN and second PLMN may be the same PLMN and/or different PLMN.

Here, C2 communication is assumed to be indirect/network-assisted; hence, two PDU sessions are established, respectively. The UAE/SEAL server receives from UTM the request to manage the C2 QoS for the UAS. Then, the UAE/SEAL server interacts with 5GC for subscribing to receive QoS related reporting and triggers. Upon receiving a QoS monitoring trigger event for the one session (e.g., UAV session), the UAE/SEAL server obtains supplement information from 5GC and determines an action which can take the form of QoS balancing within the C2 communication links of the UAS.

Step 1a, the UTM/USS sends to the control unit 405 a request to manage E2E application QoS for C2 communication. This request message will provide to the control unit 405 the capability to manage C2 communication and includes at least one of the following parameters:

UAS identification

UAV/UAV-C identification. This may include at least one of the following: external UE identifiers (GPSI, external ID) or permanent device identifiers (PEI/IMEI)

PLMN ID(s)

Transaction ID for the UAS API invocations

Application identifier (e.g., USS identifier)

UTM identifier

C2 control mode (direct stick, stick to waypoints), C2 KPIs

Geographical area where the requirement applies

Time of validity for the requirement

At Step 1b, the UAE/SEAL server responds to UTM/USS with a positive/negative acknowledgment and may further request additional UAS related information and other context information. In response of receiving the request for additional UAS related information, the UTM/USS provides at least one of the following parameters to the UAE/SEAL server:

UAV/UAV-C Application context/configuration information

C2 E2E QoS parameters

Use of HD video flag, required video resolution/encoding

A HD location map

Allowed route of the UAV

Communication/C2 quality assurance indication for the configured frequencies for C2 communication Dynamic Reroute info (UAVs' updated/expected trajectories)

At Step 2, the control unit 405 upon receiving the necessary authorization and information for managing C2 QoS, links/pairs the per UAS request, to the two corresponding PDU sessions (UAV to PLMN1 and UAV-C to PLMN2 (or PLMN1)). This triggers the translation from UAS ID/application ID to a group ID or to two (linked) GPSIs or two (linked) AF-Service-Identifiers (one for UAV and one for UAV-C) or two session IDs. This mapping is stored at the control unit 405 for further interactions with the 5GS.

At Step 3a/3b, the control unit 405 (i.e., UAE/SEAL server) acting as AF, subscribes to 5GC/NEF per each session ID or AF-Service-Identifier for the UAV and UAV-C session to receive QoS and network monitoring events. While FIG. 6 shows different PLMNs as possible implementation, but this subscribe request is also possible to single PLMN. This monitoring information is related to possible QoS downgrade of one or more Uu links (UAV-C to Network Server or Network to UAV). These links may be provided by more than one PLMNs. So, the UAE server should receive every updated information on possible QoS downgrade (this is already supported for EPS, with Explicit Congestion Notification (ECN) [e.g., as described in TS 23.401], and for 5GS with QoS notification control (QNC) [e.g., as described in TS 23.501]).

Continuing on FIG. 6B, at Step 4*a*, the control unit 405 at UAE/SEAL server receives a trigger event from the 5GC (SMF/NEF), denoting a QoS change (experienced or expected) (see messaging 613). This message includes at least one of the following parameters:

UAV ID

Application ID (e.g., C2 App #A)

Expected degraded QoS parameters (latency, reliability, data rate, jitter, . . . )

Actual degraded QoS parameters (latency, reliability, data rate, jitter, . . . )

Network status information (e.g., per TA/cell area)

QoS profile downgrade indication

At Step 4*b*, the control unit 405 at UAE/SEAL server sends a request to 5GC (SMF/NEF), to receive supplement QoS information for the UAV-C (see messaging 615). This request includes at least one of the following parameters:

UAS ID/UAV ID

Application ID (e.g., C2 App #A)

Configuration of report parameters

Based on this request, the control unit 405 at UAE/SEAL server receives a report (via N33) with the requested parameters:

UAS ID/UAV ID

Application ID (e.g., C2 App #A)

UAE/SEAL ID

Expected degraded QoS parameters (latency, reliability, data rate, jitter, . . . )

Actual QoS parameters (latency, reliability, data rate, jitter, . . . )

QoS upgrade capability indication

At Step 5, the control unit 405 at UAE/SEAL server, in response of receiving the report in Step 4*c*, checks the fulfilment/unfulfillment of the E2E QoS based on the trigger event and the UAV-C additional information (see block 617). This is performed by matching the estimated application QoS per link to the composed E2E application QoS metrics. Then, the control unit at UAE/SEAL server, determines an action, based on the evaluation of the E2E QoS. This action can the QoS adaptation of both links (QoS profile downgrade for the link receive QoS notification control, and QoS upgrade for the link which can be upgraded).

At Step 6, the control unit 405 at UAE/SEAL server, acting as AF, sends to the 5GC (to SMF via NEF or to PCF via N5) a request for a change of the QoS profile mapped to the one or both network sessions (UAV, UAV-C) or the update of the PCC rules to apply the new traffic policy (both AF triggered actions are supported in TS 23.501/502) (see messaging 619).

At Step 7, the PLMN(s) update QoS profiles for the corresponding PDU sessions (see block 621).

Figure 7:
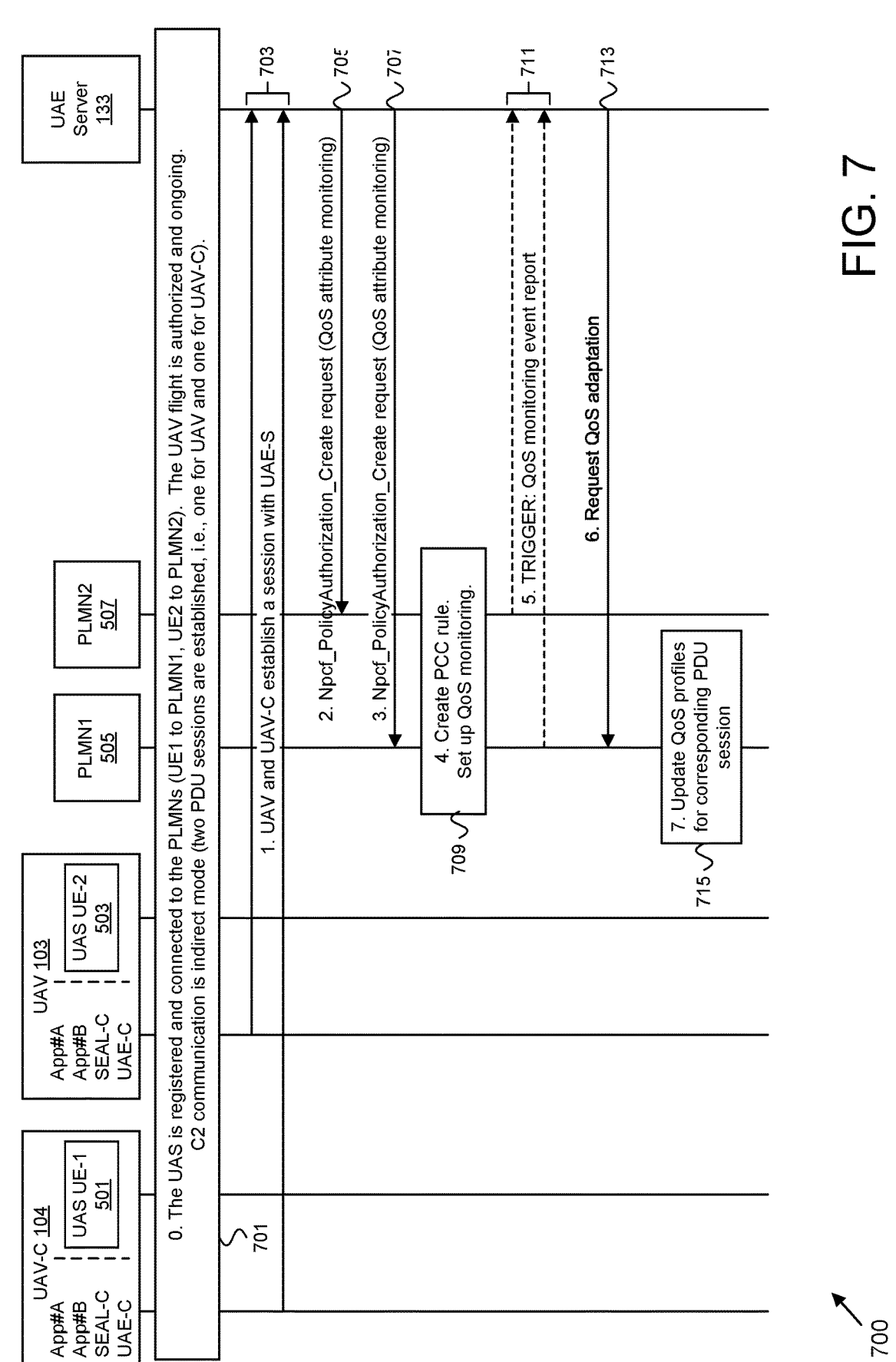
FIG. 7 is a flowchart diagram illustrating one embodiment of a procedure for end-to-end QoS fulfillment.

FIG. 7 depicts a procedure 700 for end-to-end QoS fulfillment, according to embodiments of the disclosure. The procedure 700 involves the UAV-C 104 (comprising one or more application clients and a first UAS UE 501), the UAV 103 (comprising one or more application clients and a second UAS UE 503), and a UAS Enabler Server ("UAE-S") 133. This embodiment is another alternative solution without requiring the initialization of the capability at the UAE server/AF.

At Step 0, as a precondition it is assumed that the UAV flight is ongoing, and both the UAV 103 and UAV-C 104 are connected to 3GPP network (the same or different PLMNs)

(see block 701). Here, C2 communication is assumed to be indirect/network-assisted; hence, two PDU sessions are established, respectively.

At Step 1, the UAV 103 and the UAV-C 104 establish a session with the same UAE-S 133 (see messaging 703).

At Step 2, the UAE-S 133 (an AF) sends a Npcf_PolicyAuthorization_Create request to the PCF handling the UAV 103's PDU Session in the PLMN2 507 (see messaging 705). This request indicates that the UL QoS attribute (e.g., packet delay, packet error rate) and the DL QoS attribute (e.g., packet delay, packet error rate) between the UAV 103 and the UPF in the PLMN2 507 should be monitored, and when the QoS attribute exceeds a threshold, to notify the UAS Enabler Server 133 (e.g., as described in TS 29.514).

At Step 3, the UAE-S 133 sends the same Npcf_PolicyAuthorization_Create request to the PCF handling the UAV-C 104's PDU Session in the PLMN1 505 (see messaging 707).

At Step 4, based on the above Npcf_PolicyAuthorization_Create request, the PCF(s) creates a PCC rule that matches the C2 traffic, which includes "QoS Monitoring for URLLC", which indicates that the UL QoS attribute (e.g., packet delay, packet error rate) and the DL QoS attribute (e.g., packet delay, packet error rate) of C2 traffic should be measured and, when they exceed a threshold, to send a report. In response, the SMF sends a QoS monitoring request to NG-RAN and to UPF (see block 709).

At Step 5, when the UL and/or DL QoS attribute (e.g., packet delay, packet error rate) of C2 communication exceeds a threshold, the SMF sends a report to the UAE-S 133 (either directly or via the PCF) (see messaging 711). Based on this report, the UAE-S 133 can identify when the delay of C2 packets to/from the UAV 103 exceeds a threshold and when the delay of C2 packets to/from the UAV-C 104 exceeds a threshold.

At Step 6, if the QoS attributes (e.g., packet delay, packet error rate) to/from the UAV 103 exceeds a threshold, the AF can request from the PCF handling the UAV-C 104's PDU Session to adapt the QoS (reduce the C2 packet delay) to/from the UAV-C 104 so that the overall C2 QoS (end-to-end packet delay) between the UAV and UAC-C remains within the allowable QoS (e.g., 40 ms) (see messaging 713).

At Step 7, the PLMN(s) update QoS profiles for the corresponding PDU sessions (see block 715).

Figure 8:
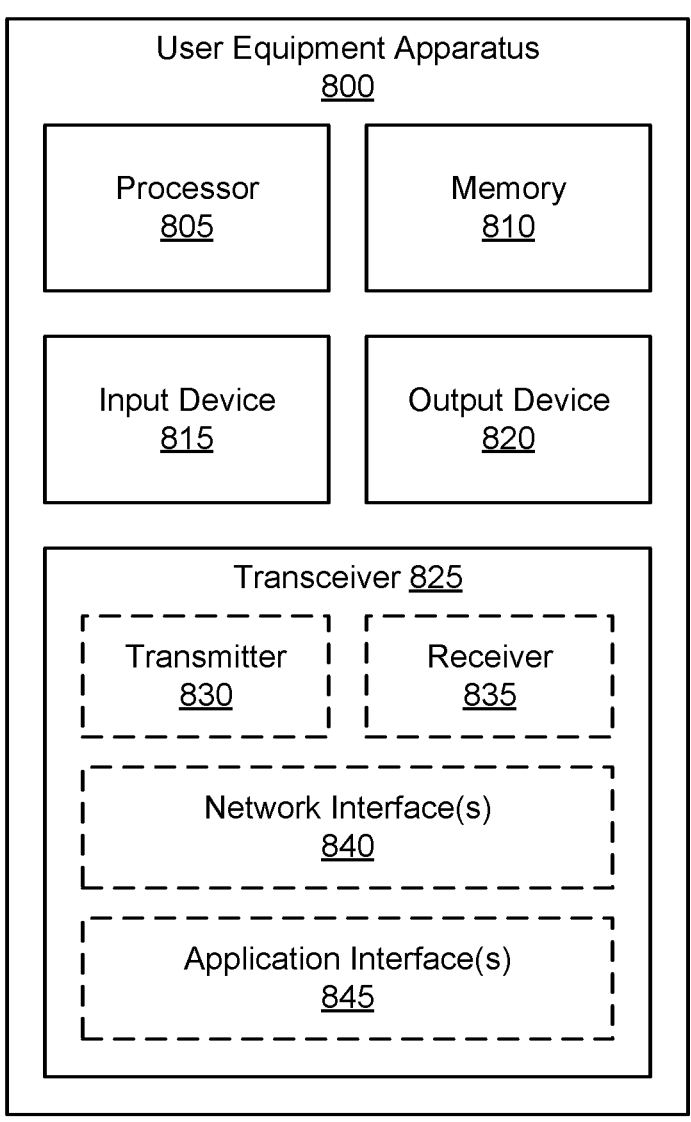
FIG. 8 is a diagram illustrating one embodiment of a user equipment apparatus that may be used for end-to-end QoS fulfillment.

FIG. 8 depicts a user equipment apparatus 800 that may be used for end-to-end QoS fulfillment, according to embodiments of the disclosure. In various embodiments, the user apparatus 800 is used to implement one or more of the solutions described above. The user apparatus 800 may be one embodiment of a UAE client and its supporting hardware, such as the UAV 103, the UAV controller 104, the UAV 201, the UAV-C 203, the UAE client 205, the UAE client 301, and/or the UAE client 305, described above. Furthermore, the user apparatus 800 may include a processor 805, a memory 810, an input device 815, an output device 820, and a transceiver 825. In some embodiments, the input device 815 and the output device 820 are combined into a single device, such as a touchscreen. In certain embodiments, the user apparatus 800 may not include any input device 815 and/or output device 820. In various embodiments, the user apparatus 800 may include one or more of: the processor 805, the memory 810, and the transceiver 825, and may not include the input device 815 and/or the output device 820.

The processor 805, in one embodiment, may include any known controller capable of executing computer-readable instructions and/or capable of performing logical operations. For example, the processor 805 may be a microcontroller, a microprocessor, a central processing unit ("CPU"), a graphics processing unit ("GPU"), an auxiliary processing unit, a FPGA, or similar programmable controller. In some embodiments, the processor 805 executes instructions stored in the memory 810 to perform the methods and routines described herein. The processor 805 is communicatively coupled to the memory 810, the input device 815, the output device 820, and the transceiver 825.

In various embodiments, the processor 805 controls the user apparatus 800 to implement the above described UAS UE and/or UAE client behaviors.

The memory 810, in one embodiment, is a computer readable storage medium. In some embodiments, the memory 810 includes volatile computer storage media. For example, the memory 810 may include a RAM, including dynamic RAM ("DRAM"), synchronous dynamic RAM ("SDRAM"), and/or static RAM ("SRAM"). In some embodiments, the memory 810 includes non-volatile computer storage media. For example, the memory 810 may include a hard disk drive, a flash memory, or any other suitable non-volatile computer storage device. In some embodiments, the memory 810 includes both volatile and non-volatile computer storage media.

In some embodiments, the memory 810 stores data related to end-to-end QoS fulfillment. For example, the memory 810 may store policies, parameters, and the like. In certain embodiments, the memory 810 also stores program code and related data, such as an operating system or other controller algorithms operating on the UAV 103 and/or UAV-C 104.

The input device 815, in one embodiment, may include any known computer input device including a touch panel, a button, a keyboard, a stylus, a microphone, or the like. In some embodiments, the input device 815 may be integrated with the output device 820, for example, as a touchscreen or similar touch-sensitive display. In some embodiments, the input device 815 includes a touchscreen such that text may be input using a virtual keyboard displayed on the touchscreen and/or by handwriting on the touchscreen. In some embodiments, the input device 815 includes two or more different devices, such as a keyboard and a touch panel.

The output device 820, in one embodiment, is designed to output visual, audible, and/or haptic signals. In some embodiments, the output device 820 includes an electronically controllable display or display device capable of outputting visual data to a user. For example, the output device 820 may include, but is not limited to, an LCD display, an LED display, an OLED display, a projector, or similar display device capable of outputting images, text, or the like to a user. As another, non-limiting, example, the output device 820 may include a wearable display separate from, but communicatively coupled to, the rest of the user apparatus 800, such as a smart watch, smart glasses, a heads-up display, or the like. Further, the output device 820 may be a component of a smart phone, a personal digital assistant, a television, a table computer, a notebook (laptop) computer, a personal computer, a vehicle dashboard, or the like.

In certain embodiments, the output device 820 includes one or more speakers for producing sound. For example, the output device 820 may produce an audible alert or notification (e.g., a beep or chime). In some embodiments, the output device 820 includes one or more haptic devices for producing vibrations, motion, or other haptic feedback. In some embodiments, all or portions of the output device 820 may be integrated with the input device 815. For example, the input device 815 and output device 820 may form a touchscreen or similar touch-sensitive display. In other embodiments, the output device 820 may be located near the input device 815.

As discussed above, the transceiver 825 communicates with one or more UAVs/UAV-Cs. The transceiver 825 operates under the control of the processor 805 to transmit messages, data, and other signals and also to receive messages, data, and other signals. For example, the processor 805 may selectively activate the transceiver (or portions thereof) at particular times in order to send and receive messages.

In various embodiments, the transceiver 825 is configured to communication with 3GPP access network(s) and/or the non-3GPP access network(s). In some embodiments, the transceiver 825 implements modem functionality for the 3GPP access network(s) and/or the non-3GPP access network(s). In one embodiment, the transceiver 825 implements multiple logical transceivers using different communication protocols or protocol stacks, while using common physical hardware.

In one embodiment, the transceiver 825 includes a first transmitter/receiver pair used to communicate with a mobile communication network over licensed radio spectrum and a second transmitter/receiver pair used to communicate with a mobile communication network over unlicensed radio spectrum. In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 825, transmitters 830, and receivers 835 may be implemented as physically separate components that access a shared hardware resource and/or software resource, such as for example, the network interface 840.

The transceiver 825 may include one or more transmitters 830 and one or more receivers 835. Although a specific number of transmitters 830 and receivers 835 are illustrated, the user equipment apparatus 800 may have any suitable number of transmitters 830 and receivers 835. Further, the transmitter(s) 830 and the receiver(s) 835 may be any suitable type of transmitters and receivers. In certain embodiments, the one or more transmitters 830 and/or the one or more receivers 835 may share transceiver hardware and/or circuitry. For example, the one or more transmitters 830 and/or the one or more receivers 835 may share antenna(s), antenna tuner(s), amplifier(s), filter(s), oscillator(s), mixer(s), modulator/demodulator(s), power supply, and the like.

In various embodiments, the transceiver 825 is capable of communicating with a mobile core network via an access network. Accordingly, the transceiver 825 may support at least one network interface 840. Here, the at least one network interface 840 facilitates communication with a RAN node, such as an eNB or gNB, for example using the "Uu" interface (e.g., LTE-Uu for eNB, NR-Uu for gNB). Additionally, the at least one network interface 840 may include an interface used for communications with one or more network functions in the mobile core network, such as a UPF 141, an AMF 143, and/or a SMF 145. For UAS communications, the transceiver 825 may support a PC5 interface for direct C2 communication. The transceiver 825 and/or processor 805 may support one or more application interfaces 845. Via an application interface 945 the user equipment apparatus may send a QoS monitoring event, such as an application QoS downgrade report.

In various embodiments, one or more transmitters 830 and/or one or more receivers 835 may be implemented and/or integrated into a single hardware component, such as a multi-transceiver chip, a system-on-a-chip, an application-specific integrated circuit ("ASIC"), or other type of hardware component. In certain embodiments, one or more transmitters 830 and/or one or more receivers 835 may be implemented and/or integrated into a multi-chip module. In some embodiments, other components such as the network interface 840 or other hardware components/circuits may be integrated with any number of transmitters 830 and/or receivers 835 into a single chip. In such embodiment, the transmitters 830 and receivers 835 may be logically configured as a transceiver 825 that uses one more common control signals or as modular transmitters 830 and receivers 835 implemented in the same hardware chip or in a multi-chip module. In certain embodiments, the transceiver 825 may implement a 3GPP modem (e.g., for communicating via NR or LTE access networks) and a non-3GPP modem (e.g., for communicating via Wi-Fi or other non-3GPP access networks).

Figure 9:
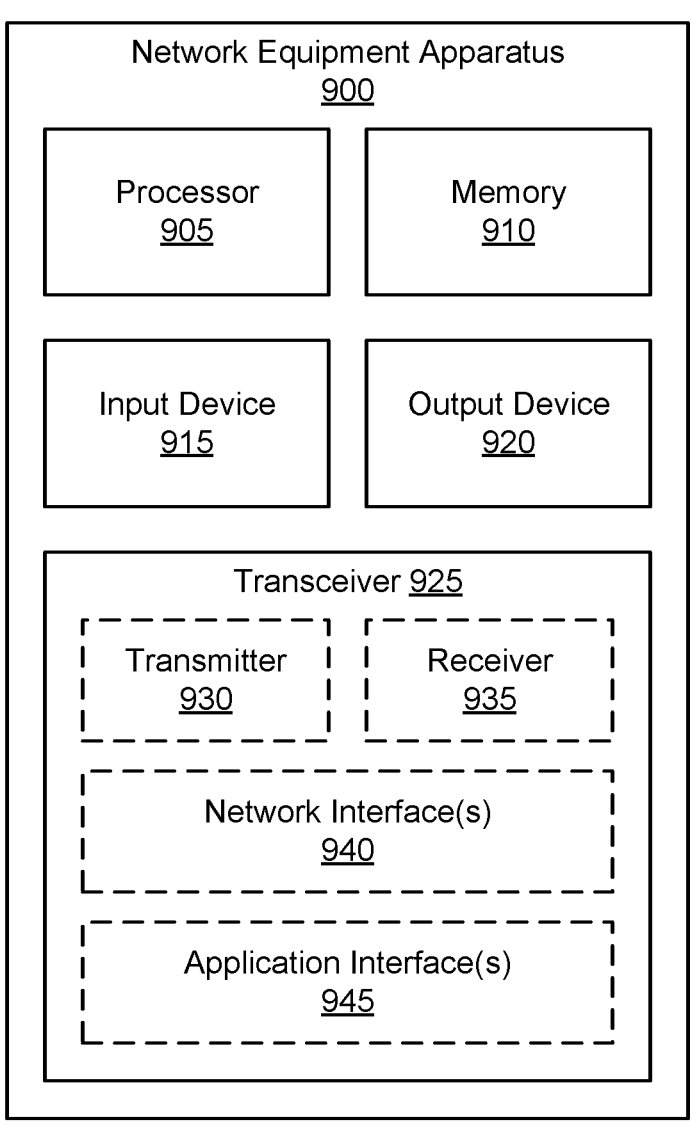
FIG. 9 is a diagram illustrating one embodiment of a network equipment apparatus that may be used for end-to-end QoS fulfillment.

FIG. 9 depicts one embodiment of a network equipment apparatus 900 that may be used for end-to-end QoS fulfillment, according to embodiments of the disclosure. In some embodiments, the network apparatus 900 may be one embodiment of a control unit and its supporting hardware, such as the UAE Server 133, SEAL Server 135, UAE Server/SEAL Server/UCF 210, and/or control unit 405, described above. Furthermore, network equipment apparatus 900 may include a processor 905, a memory 910, an input device 915, an output device 920, a transceiver 925, and application interface 945. In some embodiments, the input device 915 and the output device 920 are combined into a single device, such as a touch screen. In certain embodiments, the network equipment apparatus 900 does not include any input device 915 and/or output device 920.

As depicted, the transceiver 925 includes at least one transmitter 930 and at least one receiver 935. Here, the transceiver 925 communicates with one or more remote units 105. Additionally, the transceiver 925 may support at least one network interface 940 and/or application interface 945. In some embodiments, the transceiver 925 supports an interface (e.g., a Nnef interface) for communicating with a NEF (i.e., the NEF 127). Other network interfaces may be supported, as understood by one of ordinary skill in the art.

The processor 905, in one embodiment, may include any known controller capable of executing computer-readable instructions and/or capable of performing logical operations. For example, the processor 905 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 905 executes instructions stored in the memory 910 to perform the methods and routines described herein. The processor 905 is communicatively coupled to the memory 910, the input device 915, the output device 920, and the first transceiver 925.

In various embodiments, the processor 905 controls the network equipment apparatus 900 to implement the above described UAE client behaviors. For example, via the application interface 945, the processor 905 may receive a request to manage the QoS of an end-to-end application session. Here, the end-to-end application session comprises a first session of a first UE connected to a first network and a second session of a second UE connected to a second network.

In some embodiments, the request is received from an application running on one of the first UE and the second UE. In other embodiments, the request is received from a UTM. In certain embodiments, the first network and the second network comprise a same network (i.e., same PLMN).

In some embodiments, the first session comprises a first application session and the second session comprises a second application session. In some embodiments, the first session comprises a first network session and the second session comprises a second network session. In certain embodiments, the first UE comprises the UAV-C and the second UE comprises the UAV.

In some embodiments, the end-to-end application session supports C2 communication and has a C2 requirement consists one or more of the following parameters: an identification for a UAS, an identification for a UAV, an identification for a UAV-C, at least one PLMN ID, a Transaction ID for the UAS API invocations, an Application identifier (e.g., USS identifier), a UTM identifier, a C2 control mode (e.g., direct stick, stick to waypoints), one or more C2 KPIs, a geographical area where the requirement applies, a time of validity for the requirement, Application context for at least one of the UAV and the UAV-C, configuration information for at least one of the UAV and the UAV-C, at least one C2 end-to-end QoS parameter, a flag indicating the use of HD video for assisting C2, a video resolution/encoding required for the HD video, a HD location map for assisting C2, and an allowed route of the UAV.

The processor 905 configures a first QoS parameter for the first session of the first UE and a second QoS parameter for the second session of the second UE. In certain embodiments, the configuration is provided to the first and the second UEs via establishing application sessions between the apparatus and the first and second UEs.

In some embodiments, the configuration further comprises at least one mapping for the sessions of the first and the second UEs, the mapping comprising at least one of: a mapping of a UAS ID to a group ID; a mapping of the application ID to the group ID; a mapping of a UAS ID to two (linked) GPSIs; a mapping of the application ID to the two (linked) GPSIs; a mapping of a UAS ID to two (linked) AF-Service-Identifiers or two (linked) session IDs; a mapping of the application ID to the two (linked) AF-Service-Identifiers or two (linked) session IDs; and a mapping of a service API to control APIs for the application sessions of the first and the second UEs, where the service API is received by UTM and/or USS per UAS.

The processor 905 receives a trigger event related to the QoS change of the second QoS parameter. In some embodiments, the trigger event comprises a downgrade indication for the second QoS parameter.

In some embodiments, the trigger event comprises at least one of the following parameters: an Application ID (e.g., C2 App #A), an expected degraded QoS parameters (latency, reliability, data rate, jitter, . . . ), an actual degraded QoS parameters (latency, reliability, data rate, jitter, . . . ), an expected location of the UAV, an actual location of the UAV, UAV mobility information, a high interference indication, network status information (per TA/cell area), a QoS profile downgrade indication, an indication of RAN congestion and/or overload condition, and a QoS upgrade indication for QoS flow.

In some embodiments, the processor 905 obtains supplementary QoS and/or UE context information for the second application session of the second UE, wherein the supplementary information comprises at least one of: one or more expected QoS parameters (e.g., latency, reliability, data rate, jitter, . . . ), one or more actual QoS parameters (e.g., latency, reliability, data rate, jitter, . . . ), one or more expected QoE parameters (e.g., received video quality), one or more actual QoE parameters (e.g., received video quality), a QoS upgrade capability indication, location information for the second UE, and mobility information for the second UE.

The processor 905 determines a third QoS parameter for the first session of the first UE based on the QoS change of the second QoS parameter and communicates the third QoS parameter to the first network.

In some embodiments, the processor 905 determines a fourth QoS parameter for the second application session of the second UE based on the QoS change of the second QoS parameter and communicates the fourth QoS parameter to the second network. In certain embodiments, the third QoS parameter may an upgrade of the first QoS parameter and wherein the fourth QoS parameter is a downgrade of the second QoS parameter. In other embodiments, the third QoS parameter is a downgrade of the first QoS parameter and wherein the fourth QoS parameter is an upgrade of the second QoS parameter.

In some embodiments, the determination of the third and fourth QoS parameters are mapped to a traffic policy/PCC rule update and/or to a network QoS profile update for the first and the second UE. In some embodiments, communicating the third parameter comprising sending a QoS profile change request to the first network (e.g., to a PCF or SMF in the first network). Similarly, in some embodiments, communicating the fourth parameter comprising sending a QoS profile change request to the second network (e.g., to a PCF or SMF in the second network).

The memory 910, in one embodiment, is a computer readable storage medium. In some embodiments, the memory 910 includes volatile computer storage media. For example, the memory 910 may include a RAM, including dynamic RAM ("DRAM"), synchronous dynamic RAM ("SDRAM"), and/or static RAM ("SRAM"). In some embodiments, the memory 910 includes non-volatile computer storage media. For example, the memory 910 may include a hard disk drive, a flash memory, or any other suitable non-volatile computer storage device. In some embodiments, the memory 910 includes both volatile and non-volatile computer storage media. In some embodiments, the memory 910 stores data relating to selecting a server application instance, for example storing server addresses, UE locations, DNS cache, and the like. In certain embodiments, the memory 910 also stores program code and related data, such as an operating system ("OS") or other controller algorithms operating on the network equipment apparatus 900 and one or more software applications.

The input device 915, in one embodiment, may include any known computer input device including a touch panel, a button, a keyboard, a stylus, a microphone, or the like. In some embodiments, the input device 915 may be integrated with the output device 920, for example, as a touchscreen or similar touch-sensitive display. In some embodiments, the input device 915 includes a touchscreen such that text may be input using a virtual keyboard displayed on the touchscreen and/or by handwriting on the touchscreen. In some embodiments, the input device 915 includes two or more different devices, such as a keyboard and a touch panel.

The output device 920, in one embodiment, may include any known electronically controllable display or display device. The output device 920 may be designed to output visual, audible, and/or haptic signals. In some embodiments, the output device 920 includes an electronic display capable of outputting visual data to a user. For example, the output device 920 may include, but is not limited to, an LCD display, an LED display, an OLED display, a projector, or similar display device capable of outputting images, text, or the like to a user. As another, non-limiting, example, the output device 920 may include a wearable display such as a smart watch, smart glasses, a heads-up display, or the like. Further, the output device 920 may be a component of a smart phone, a personal digital assistant, a television, a table computer, a notebook (laptop) computer, a personal computer, a vehicle dashboard, or the like.

In certain embodiments, the output device 920 includes one or more speakers for producing sound. For example, the output device 920 may produce an audible alert or notification (e.g., a beep or chime). In some embodiments, the output device 920 includes one or more haptic devices for producing vibrations, motion, or other haptic feedback. In some embodiments, all or portions of the output device 920 may be integrated with the input device 915. For example, the input device 915 and output device 920 may form a touchscreen or similar touch-sensitive display. In other embodiments, all or portions of the output device 920 may be located near the input device 915.

As discussed above, the transceiver 925 may communicate with one or more remote units and/or with one or more interworking functions that provide access to one or more PLMNs. The transceiver 925 may also communicate with one or more network functions (e.g., in the mobile core network 120). The transceiver 925 operates under the control of the processor 905 to transmit messages, data, and other signals and also to receive messages, data, and other signals. For example, the processor 905 may selectively activate the transceiver (or portions thereof) at particular times in order to send and receive messages.

The transceiver 925 may include one or more transmitters 930 and one or more receivers 935. In certain embodiments, the one or more transmitters 930 and/or the one or more receivers 935 may share transceiver hardware and/or circuitry. For example, the one or more transmitters 930 and/or the one or more receivers 935 may share antenna(s), antenna tuner(s), amplifier(s), filter(s), oscillator(s), mixer(s), modulator/demodulator(s), power supply, and the like. In one embodiment, the transceiver 925 implements multiple logical transceivers using different communication protocols or protocol stacks, while using common physical hardware.

FIG. 10 depicts one embodiment of a method 1000 for end-to-end QoS fulfillment, according to embodiments of the disclosure. In various embodiments, the method 1000 is performed by a control unit, such as the UAE Server 133, SEAL Server 135, UAE Server/SEAL Server/UCF 210, control unit 405, and/or network equipment apparatus 900, described above. In some embodiments, the method 1000 is performed by a processor, such as a microcontroller, a microprocessor, a CPU, a GPU, an auxiliary processing unit, a FPGA, or the like.

The method 1000 begins and receives 1005 a request to manage the QoS of an end-to-end application session. Here, the end-to-end application session comprises a first session of a first UE connected to a first network and a second session of a second UE connected to a second network. The method 1000 includes configuring 1010 a first QoS parameter for the first session of the first UE and a second QoS parameter for the second session of the second UE. The method 1000 includes receiving 1015 a trigger event related to the QoS change of the second QoS parameter. The method 1000 includes determining 1020 a third QoS parameter for the first session of the first UE based on the QoS change of the second QoS parameter. The method 1000 includes communicating 1025 the third QoS parameter to the first network. The method 1000 ends.

Disclosed herein is a first apparatus for end-to-end QoS fulfillment, according to embodiments of the disclosure. The first apparatus may be implemented by a control unit, such as the UAE Server 133, SEAL Server 135, UAE Server/SEAL Server/UCF 210, control unit 405, and/or network equipment apparatus 900. The first apparatus includes an interface that receives a request to manage the QoS of an end-to-end application session. Here, the end-to-end application session comprises a first session of a first UE connected to a first network and a second session of a second UE connected to a second network. The processor configures a first QoS parameter for the first session of the first UE and a second QoS parameter for the second session of the second UE and receives a trigger event related to the QoS change of the second QoS parameter. The processor determines a third QoS parameter for the first session of the first UE based on the QoS change of the second QoS parameter and communicates the third QoS parameter to the first network.

In certain embodiments, the first network and the second network comprise a same network (e.g., same PLMN). In some embodiments, the first session comprises a first application session and the second session comprises a second application session. In other embodiments, the first session comprises a first network session and the second session comprises a second network session.

In some embodiments, the end-to-end application session supports C2 communication and has a C2 requirement consists one or more of the following parameters: an identification for a UAS, an identification for a UAV, an identification for a UAV-C, at least one PLMN ID, a Transaction ID for the UAS API invocations, an Application identifier (e.g., USS identifier), a UTM identifier, a C2 control mode (e.g., direct stick, stick to waypoints), one or more C2 KPIs, a geographical area where the requirement applies, a time of validity for the requirement, Application context for at least one of the UAV and the UAV-C, configuration information for at least one of the UAV and the UAV-C, at least one C2 end-to-end QoS parameter, a flag indicating the use of HD video for assisting C2, a video resolution/encoding required for the HD video, a HD location map for assisting C2, and an allowed route of the UAV.

In certain embodiments, the first UE comprises the UAV-C and the second UE comprises the UAV. In some embodiments, the request is received from an application running on one of the first UE and the second UE. In other embodiments, the request is received from a UTM.

In some embodiments, the configuration further comprises at least one mapping for the sessions of the first and the second UEs, the mapping comprising at least one of: a mapping of a UAS ID to a group ID; a mapping of the application ID to the group ID; a mapping of a UAS ID to two (linked) GPSIs; a mapping of the application ID to the two (linked) GPSIs; a mapping of a UAS ID to two (linked) AF-Service-Identifiers or two (linked) session IDs; a mapping of the application ID to the two (linked) AF-Service-Identifiers or two (linked) session IDs; and a mapping of a service API to control APIs for the application sessions of the first and the second UEs, where the service API is received by UTM and/or USS per UAS. In certain embodiments, the configuration is provided to the first and the second UEs via establishing application sessions between the apparatus and the first and second UEs.

In some embodiments, the trigger event comprises a downgrade indication for the second QoS parameter. In some embodiments, the trigger event comprises at least one of the following parameters: an Application ID (e.g., C2 App #A), an expected degraded QoS parameters (latency, reliability, data rate, jitter, . . . ), an actual degraded QoS parameters (latency, reliability, data rate, jitter, . . . ), an expected location of the UAV, an actual location of the UAV, UAV mobility information, a high interference indication, network status information (per TA/cell area), a QoS profile downgrade indication, an indication of RAN congestion and/or overload condition, and a QoS upgrade indication for QoS flow.

In some embodiments, the processor obtains supplementary QoS and/or UE context information for the second application session of the second UE, wherein the supplementary information comprises at least one of: one or more expected QoS parameters (e.g., latency, reliability, data rate, jitter, . . . ), one or more actual QoS parameters (e.g., latency, reliability, data rate, jitter, . . . ), one or more expected QoE parameters (e.g., received video quality), one or more actual QoE parameters (e.g., received video quality), a QoS upgrade capability indication, location information for the second UE, and mobility information for the second UE.

In some embodiments, the processor determines a fourth QoS parameter for the second application session of the second UE based on the QoS change of the second QoS parameter and communicates the fourth QoS parameter to the second network. In such embodiments, the third QoS parameter is an upgrade of the first QoS parameter and wherein the fourth QoS parameter is a downgrade of the second QoS parameter. In certain embodiments, the third QoS parameter is a downgrade of the first QoS parameter and wherein the fourth QoS parameter is an upgrade of the second QoS parameter.

In some embodiments, the determination of the third and fourth QoS parameters are mapped to a traffic policy/PCC rule update and/or to a network QoS profile update for the first and the second UE. In some embodiments, communicating the fourth parameter comprising sending a QoS profile change request to the second network (e.g., to PCF or SMF). In some embodiments, communicating the third parameter comprising sending a QoS profile change request to the first network (e.g., to PCF or SMF).

Disclosed herein is a first method for end-to-end QoS fulfillment, according to embodiments of the disclosure. The first method may be performed by a control unit, such as the UAE Server 133, SEAL Server 135, UAE Server/SEAL Server/UCF 210, control unit 405, and/or network equipment apparatus 900. The first method includes receiving a request to manage the QoS of an end-to-end application session. Here, the end-to-end application session comprises a first session of a first UE connected to a first network and a second session of a second UE connected to a second network. The method includes configuring a first QoS parameter for the first session of the first UE and a second QoS parameter for the second session of the second UE and receiving a trigger event related to the QoS change of the second QoS parameter. The method includes determining a third QoS parameter for the first session of the first UE based on the QoS change of the second QoS parameter and communicating the third QoS parameter to the first network.

In certain embodiments, the first network and the second network comprise a same network (e.g., same PLMN). In some embodiments, the first session comprises a first application session and the second session comprises a second application session. In other embodiments, the first session comprises a first network session and the second session comprises a second network session.

In some embodiments, the end-to-end application session supports C2 communication and has a C2 requirement consists one or more of the following parameters: an identification for a UAS, an identification for a UAV, an identification for a UAV-C, at least one PLMN ID, a Transaction ID for the UAS API invocations, an Application identifier (e.g., USS identifier), a UTM identifier, a C2 control mode (e.g., direct stick, stick to waypoints), one or more C2 KPIs, a geographical area where the requirement applies, a time of validity for the requirement, Application context for at least one of the UAV and the UAV-C, configuration information for at least one of the UAV and the UAV-C, at least one C2 end-to-end QoS parameter, a flag indicating the use of HD video for assisting C2, a video resolution/encoding required for the HD video, a HD location map for assisting C2, and an allowed route of the UAV.

In certain embodiments, the first UE comprises the UAV-C and the second UE comprises the UAV. In some embodiments, the request is received from an application running on one of the first UE and the second UE. In other embodiments, the request is received from a UTM.

In some embodiments, the configuration further comprises at least one mapping for the sessions of the first and the second UEs, the mapping comprising at least one of: a mapping of a UAS ID to a group ID; a mapping of the application ID to the group ID; a mapping of a UAS ID to two (linked) GPSIs; a mapping of the application ID to the two (linked) GPSIs; a mapping of a UAS ID to two (linked) AF-Service-Identifiers or two (linked) session IDs; a mapping of the application ID to the two (linked) AF-Service-Identifiers or two (linked) session IDs; and a mapping of a service API to control APIs for the application sessions of the first and the second UEs, where the service API is received by UTM and/or USS per UAS. In certain embodiments, the request to manage the QoS of an end-to-end application session is received at a control unit and the configuration is provided to the first and the second UEs via establishing application sessions between the control unit and the first and second UEs.

In some embodiments, the trigger event comprises a downgrade indication for the second QoS parameter. In some embodiments, the trigger event comprises at least one of the following parameters: an Application ID (e.g., C2 App #A), an expected degraded QoS parameters (latency, reliability, data rate, jitter, . . . ), an actual degraded QoS parameters (latency, reliability, data rate, jitter, . . . ), an expected location of the UAV, an actual location of the UAV, UAV mobility information, a high interference indication, network status information (per TA/cell area), a QoS profile downgrade indication, an indication of RAN congestion and/or overload condition, and a QoS upgrade indication for QoS flow.

In some embodiments, the processor obtains supplementary QoS and/or UE context information for the second application session of the second UE, wherein the supplementary information comprises at least one of: one or more expected QoS parameters (e.g., latency, reliability, data rate, jitter, . . . ), one or more actual QoS parameters (e.g., latency, reliability, data rate, jitter, . . . ), one or more expected QoE parameters (e.g., received video quality), one or more actual QoE parameters (e.g., received video quality), a QoS upgrade capability indication, location information for the second UE, and mobility information for the second UE.

In some embodiments, the first method further comprises determining a fourth QoS parameter for the second application session of the second UE based on the QoS change of the second QoS parameter and communicating the fourth QoS parameter to the second network. In such embodiments, the third QoS parameter is an upgrade of the first QoS parameter and wherein the fourth QoS parameter is a downgrade of the second QoS parameter. In certain embodiments, the third QoS parameter is a downgrade of the first QoS parameter and wherein the fourth QoS parameter is an upgrade of the second QoS parameter.

In some embodiments, the determination of the third and fourth QoS parameters are mapped to a traffic policy/PCC rule update and/or to a network QoS profile update for the first and the second UE. In some embodiments, communicating the fourth parameter comprising sending a QoS profile change request to the second network (e.g., to PCF or SMF). In some embodiments, communicating the third parameter comprising sending a QoS profile change request to the first network (e.g., to PCF or SMF).

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
   at least one memory; and
   at least one processor coupled with the at least one memory and configured to cause the apparatus to:
   receive a request to manage a quality of service ("QoS") of an end-to-end application session, wherein the end-to-end application session comprises a first session of a first user equipment ("UE") and a second session of a second UE;
   configure one or more first QoS parameters for the first session and one or more second QoS parameters for the second session;
   receive a trigger event related to a QoS change to the one or more second QoS parameters, wherein the trigger event comprises a downgrade indication for the one or more second QoS parameters;
   perform a QoS adaptation for at least one of the one or more first QoS parameters for the first session based on the QoS change to the one or more second QoS parameters; and
   communicate the QoS adaptation to a first network associated with the first UE.

2. The apparatus of claim 1, wherein the second UE is connected to a second network different than the first network.

3. The apparatus of claim 1, wherein the first session comprises a first application session and the second session comprises a second application session.

4. The apparatus of claim 1, wherein the first session comprises a first network session and the second session comprises a second network session.

5. The apparatus of claim 1, wherein the end-to-end application session supports command and control ("C2") communication and has a C2 requirement comprising one or more of the following parameters:
   an identification for an unmanned aerial system ("UAS") comprising first UE and the second UE,

an identification for an unmanned aerial vehicle ("UAV") associated with the UAS, an identification for a UAV controller ("UAV-C") associated with the UAS, at least one public land mobile network identifier ("PLMN ID"), a transaction identifier ("ID") for UAS application programming interface ("API") invocations, an application ID, a UAS Traffic Manager ("UTM") ID, a C2 control mode, one or more C2 Key Performance Indicators, a geographical area where the requirement applies, a time of validity for the requirement, an application context for at least one of the UAV or the UAV-C, configuration information for at least one of the UAV or the UAV-C, at least one C2 end-to-end QoS parameter, a flag indicating the use of high-definition ("HD") video for assisting C2, a video resolution/encoding required for the HD video, a HD location map for assisting C2, an allowed route of the UAV, or a combination thereof.

6. The apparatus of claim 5, wherein the first UE comprises the UAV-C and the second UE comprises the UAV.

7. The apparatus of claim 1, wherein the request is received from an application running on one of the first UE or the second UE, or both.

8. The apparatus of claim 1, wherein the request is received from an Unmanned Aerial System ("UAS") Traffic Manager ("UTM").

9. The apparatus of claim 1, wherein the at least one processor is configured to cause the apparatus to transmit at least one mapping for the sessions of the first UE and the second UE, the mapping comprising at least one of:

a mapping of an Unmanned Aerial System ("UAS") identifier ("ID") to a group ID;

a mapping of an application ID to the group ID;

a mapping of the UAS ID to two Generic Public Service Identifiers ("GPSIs");

a mapping of the application ID to the two GPSIs;

a mapping of the UAS ID to two application function service identifiers;

a mapping of the application ID to two application function service identifiers;

a mapping of the UAS ID to two session IDs;

a mapping of the application ID to two session IDs;

a mapping of a service API to one or more control APIs for application sessions of the first UE and the second UE, where the service API is received by UAS Traffic Manager ("UTM") and/or UAS Service Suppliers ("USS") per UAS;

or a combination thereof.

10. The apparatus of claim 9, wherein the request to manage the QoS of an end-to-end application session is received at a control unit, wherein the mapping is provided to the first UE and the second UE via establishing application sessions between the control unit and the first UE and the second UE.

11. The apparatus of claim 1, wherein the at least one processor is further configured to cause the apparatus to obtain supplementary QoS and/or UE context information for the second session, wherein the supplementary information comprises at least one of:

one or more expected QoS parameters,

one or more actual QoS parameters, one or more expected quality of experience ("QoE") parameters, one or more actual QoE parameters, a QoS upgrade capability indication, location information for the second UE, mobility information for the second UE, or a combination thereof.

12. The apparatus of claim 1, wherein the at least one processor is further configured to cause the apparatus to:

perform a second QoS adaptation for the second session based on the QoS change of the one or more second QoS parameters; and communicate the second QoS adaptation for the second session to the first network or an additional network connected to the second UE.

13. The apparatus of claim 12, wherein the QoS adaptation for the at least one of the one or more first QoS parameters for the first session comprises an upgrade to the at least one of the one or more first QoS parameters, and wherein the second QoS adaptation for the second session comprises a downgrade to at least one of the one or more second QoS parameters.

14. The apparatus of claim 12, wherein the QoS adaptation for the at least one of the one or more first QoS parameters for the first session comprises a downgrade to the at least one of the one or more first QoS parameters, and wherein the second QoS adaptation for the second session comprises an upgrade to at least one of the one or more second QoS parameters.

15. The apparatus of claim 12, wherein the first QoS adaptation and the second QoS adaptation are mapped to one or more of:

a traffic policy rule update for the first UE, a traffic policy rule update for the second UE, a policy and charging control ("PCC") rule update for the first UE, a PCC rule update for the second UE, a network QoS profile update for the first UE, a network QoS profile update for the second UE, or a combination thereof.

16. The apparatus of claim 12, wherein to communicate the second QoS adaptation for the second session, the at least one processor is configure to transmit a QoS profile change request to the first network or the additional network connected to the second UE.

17. The apparatus of claim 1, wherein to communicate the QoS adaptation, the at least one processor is configure to transmit a QoS profile change request to the first network.

18. A method comprising:

receiving a request to manage a quality of service ("QoS") of an end-to-end application session, wherein the end-to-end application session comprises a first session of a first user equipment ("UE") and a second session of a second UE;

configuring one or more first QoS parameters for the first session and one or more second QoS parameters for the second session;

receiving a trigger event related to a QoS change to the one or more second QoS parameters, wherein the trigger event comprises a downgrade indication for the one or more second QoS parameters;

performing a QoS adaptation for at least one of the one or more first QoS parameters for the first session based on the QoS change to the one or more second QoS parameters; and communicating the QoS adaptation to a first network associated with the first UE.

19. The method of claim 18, wherein communicating the QoS adaptation comprises sending a QoS profile change request to the first network.

20. The method of claim 19, further comprising:

performing a second QoS adaptation for the second session based on the QoS change of the one or more second QoS parameters; and communicating the second QoS adaptation to the first network or an additional network associated with the second UE.

\* \* \* \* \*